(12) United States Patent
Degner et al.

(10) Patent No.: US 11,817,755 B2
(45) Date of Patent: Nov. 14, 2023

(54) AXISYMMETRIC LINEAR RESONANT ACTUATORS

(71) Applicant: Apple Inc., Cupertino, CA (US)

(72) Inventors: Brett W. Degner, Menlo Park, CA (US); Brenton A. Baugh, Los Altos Hills, CA (US); Shingo Yoneoka, Saratoga, CA (US); Songsheng Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 17/336,074

(22) Filed: Jun. 1, 2021

(65) Prior Publication Data

US 2022/0385160 A1 Dec. 1, 2022

(51) Int. Cl.
*H02K 33/18* (2006.01)
*H02K 1/34* (2006.01)
*G06F 3/01* (2006.01)
*G06F 3/0354* (2013.01)

(52) U.S. Cl.
CPC .............. *H02K 33/18* (2013.01); *H02K 1/34* (2013.01); *G06F 3/016* (2013.01); *G06F 3/03545* (2013.01)

(58) Field of Classification Search
CPC .......... H02K 33/18; H02K 1/34; G06F 3/016; G06F 3/03545
See application file for complete search history.

(56) References Cited

U.S. PATENT DOCUMENTS

| | | | |
|---|---|---|---|
| 5,007,513 A * | 4/1991 | Carlson | F16J 15/43 |
| | | | 252/62.52 |
| 5,179,306 A | 1/1993 | Nasar | |
| 5,231,336 A * | 7/1993 | van Namen | H02K 33/18 |
| | | | 318/128 |
| 7,898,121 B2 | 3/2011 | Ramsay et al. | |
| 9,762,112 B2 | 9/2017 | Sutani et al. | |

(Continued)

FOREIGN PATENT DOCUMENTS

| | | | |
|---|---|---|---|
| JP | 2006162024 A * | 6/2006 | |
| JP | 2007221960 | 8/2007 | |
| WO | WO-2007014570 A1 * | 2/2007 | H02K 41/031 |

OTHER PUBLICATIONS

JP2006162024A_translate (Year: 2006).*
WO2007014570A1_translate (Year: 2007).*

*Primary Examiner* — Tulsidas C Patel
*Assistant Examiner* — Mohammed Ahmed Qureshi
(74) *Attorney, Agent, or Firm* — Brownstein Hyatt Farber Schreck, LLP

(57) ABSTRACT

A linear resonant actuator includes a ferritic tube, a movable mass, first and second flexures, and a set of one or more flexures. The ferritic tube has an axis extending from a first end of the ferritic tube to a second end of the ferritic tube. The movable mass has a set of magnet sections disposed along the axis. First and second flexures mechanically couple first and second ends of the movable mass to the ferritic tube. The flexures suspend the movable mass within the ferritic tube and allow movement of the movable mass along the axis. The electric coil(s) are attached to the ferritic tube and extend around the movable mass, between the ferritic tube and the movable mass. Each magnet section has magnetic poles disposed at different positions along the axis, and like magnetic poles of adjacent magnetic sections face each other.

20 Claims, 15 Drawing Sheets

(56) References Cited

U.S. PATENT DOCUMENTS

2017/0070131 A1* 3/2017 Degner .................. H02K 33/00
2019/0238038 A1* 8/2019 Kim ....................... H02K 33/02
2021/0067022 A1* 3/2021 Wopat .................. H05K 5/0217

* cited by examiner

AXISYMMETRIC LINEAR RESONANT ACTUATORS

FIELD

The described embodiments generally relate to the construction of linear resonant actuators (LRAs) and, more particularly, to LRAs that can be used as haptic actuators in electronic devices.

BACKGROUND

Many of today's devices include a haptic actuator. Some of the devices that may include a haptic actuator, or even multiple haptic actuators, include mobile phones, computers (e.g., tablet computers or laptop computers), wearable devices (e.g., electronic watches or health or fitness tracking devices), hand-held or worn navigation devices, gaming devices (whether worn or held), augmented or virtual reality devices, styluses, and so on.

SUMMARY

Embodiments of the systems, devices, methods, and apparatus described in the present disclosure are directed to the construction, configuration, or operation of LRAs.

In a first aspect, an LRA is described. The LRA may include a ferritic tube having an axis extending from a first end of the ferritic tube to a second end of the ferritic tube. The LRA may also include a movable mass having a set of magnet sections disposed along the axis. A first flexure may mechanically couple a first end of the movable mass to the ferritic tube, and a second flexure may mechanically couple a second end of the movable mass to the ferritic tube. A set of one or more electric coils may be attached to the ferritic tube and extend around the movable mass, between the ferritic tube and the movable mass. Each magnet section in the set of magnet sections may have magnetic poles disposed at different positions along the axis. Like magnetic poles of adjacent magnetic sections may face each other. The first flexure and the second flexure may suspend the movable mass within the ferritic tube and allow movement of the movable mass along the axis.

In a second aspect, another LRA is described. The LRA may include a frame, and an axisymmetric movable mass mounted to the frame and movable along an axis. The axisymmetric movable mass may include a core and a set of magnet sections. Each magnet section may be disposed at a different position along the axis and encircle the core. Each magnet section may have opposite magnetic poles disposed at different positions along the axis, with like magnetic poles of adjacent magnet sections facing each other. A set of flexures may attach the axisymmetric movable mass to the frame and constrain movement of the asymmetric movable mass to movement along the axis. At least one electric coil may encircle the axisymmetric movable mass and be fixed to the frame.

In a third aspect, a haptic actuator is described. The haptic actuator may include an enclosure having a cylindrical body portion, a first end cap disposed at a first end of the cylindrical body portion, and a second end cap disposed at a second end of the cylindrical body portion. A movable mass may be housed within the enclosure and may be movable along an axis extending between the first end cap and the second end cap. The movable mass may include a set of magnet sections disposed along the axis. A first flexure may have a first inward portion attached to a first end of the movable mass and a first outward portion attached to the enclosure between the cylindrical body portion and the first end cap. A second flexure may have a second inward portion attached to a second end of the movable mass and a second outward portion attached to the enclosure between the cylindrical body portion and the second end cap. A set of one or more electric coils may wrap around the axis of the movable mass, between the housing and the movable mass.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

FIG. 11 shows an example of a stylus, electronic pencil, or the like; and

Figure 1A:
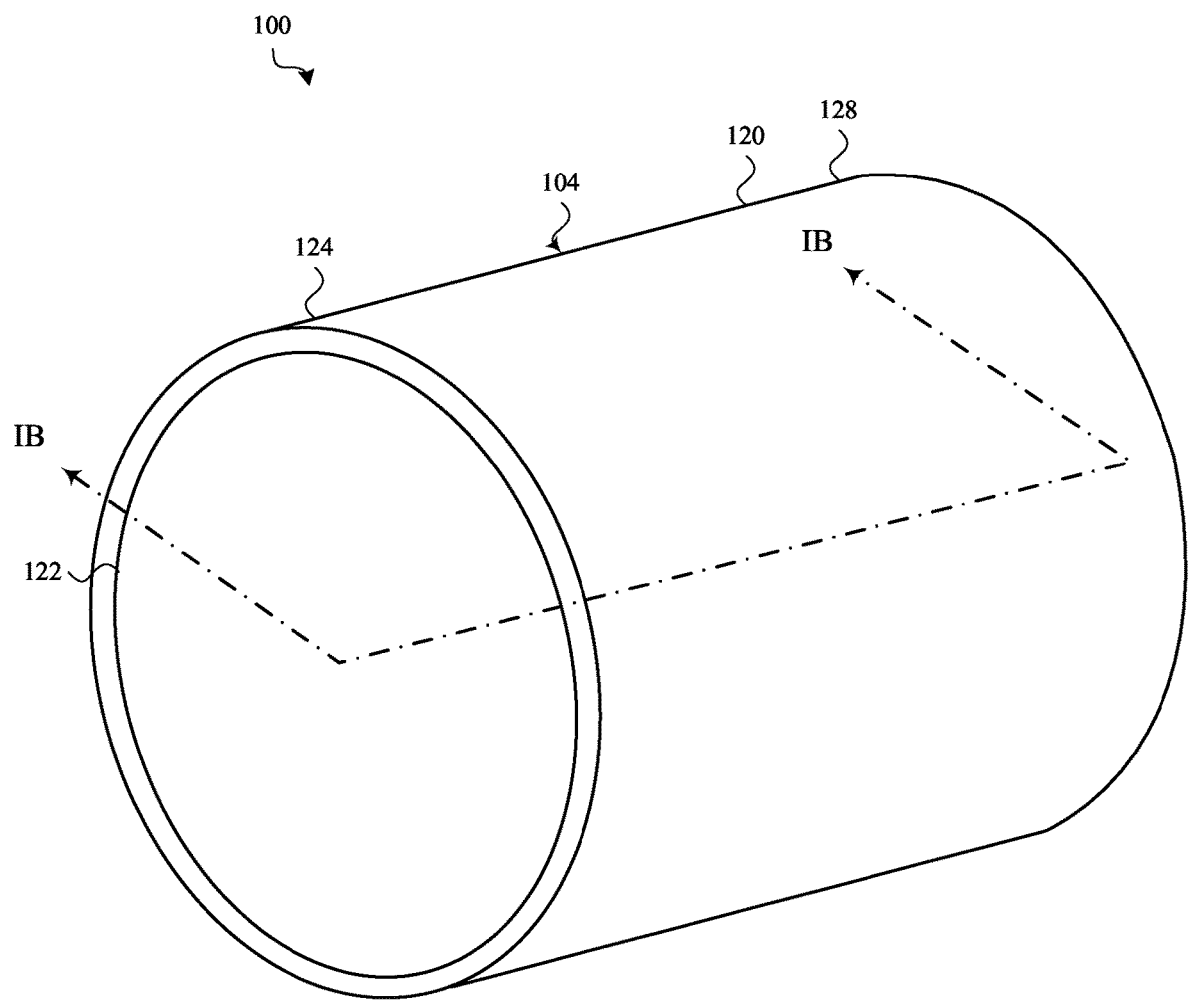
FIGS. 1A and 1B show a first example of an LRA.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

When selecting or designing a haptic actuator for an electronic device, the physical and electrical aspects of the haptic actuator may depend on, and may need to be weighed against or traded off against, the physical and electrical aspects of other modules that are incorporated into the device. For example, the physical and electrical aspects of a haptic actuator may need to be traded off against the physical and electrical aspects of a battery. In some cases, this may lead to a desire (or even a need) for a haptic actuator that fits into a small space and is electrically efficient. Although various parameters of a haptic actuator can be adjusted to make the haptic actuator smaller, making a haptic actuator that is both small and electrically efficient while also preserving the magnitude of the actuator's haptic output is challenging. Additional constraints may be placed on haptic actuator design when a haptic actuator is placed into a relatively small device, such as a stylus, earbud, or wearable device (e.g., an electronic watch or health or fitness tracking device).

The LRAs disclosed herein each incorporate one or more features that enable them to be manufactured small, or to operate in an electrically efficient way, or to be scaled/configured/adapted to different space constraints and/or haptic output requirements, and so on. Some of the features incorporated into various ones of the LRA embodiments described herein include: an axisymmetric movable mass and/or other components; a movable mass having magnets (or magnet sections) polarized in a generally axial direction of travel; a non-ferritic or mildly ferritic core that avoids stealing (or steals less) magnetic flux and/or enhances the movable mass of an LRA; ferritic spacers between magnets (or magnet sections) that channel magnetic flux and enhance the movable mass; space-efficient flexures that suspend the movable mass in all degrees of freedom and provide centering forces (restorative forces) for linear resonant movement; a ferritic tube that channels magnetic flux to improve operating efficiency and contain stray magnetic flux; easy scalability by varying the diameters, lengths, and number of magnets (or magnet sections) and electric coils of an LRA.

Incorporating some or all of the above features into an LRA can make the LRA more efficient in terms of acceleration and so on.

For purposes of this description, a "mildly ferritic" material is defined to be a material having a relative magnetic permeability less than about 1.10, plus or minus 10% (e.g., 301 type stainless steel (SUS301), tungsten, and so on).

These and other systems, devices, methods, and apparatus are described with reference to FIGS. 1A-12. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration and is not always limiting. Directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 1B:
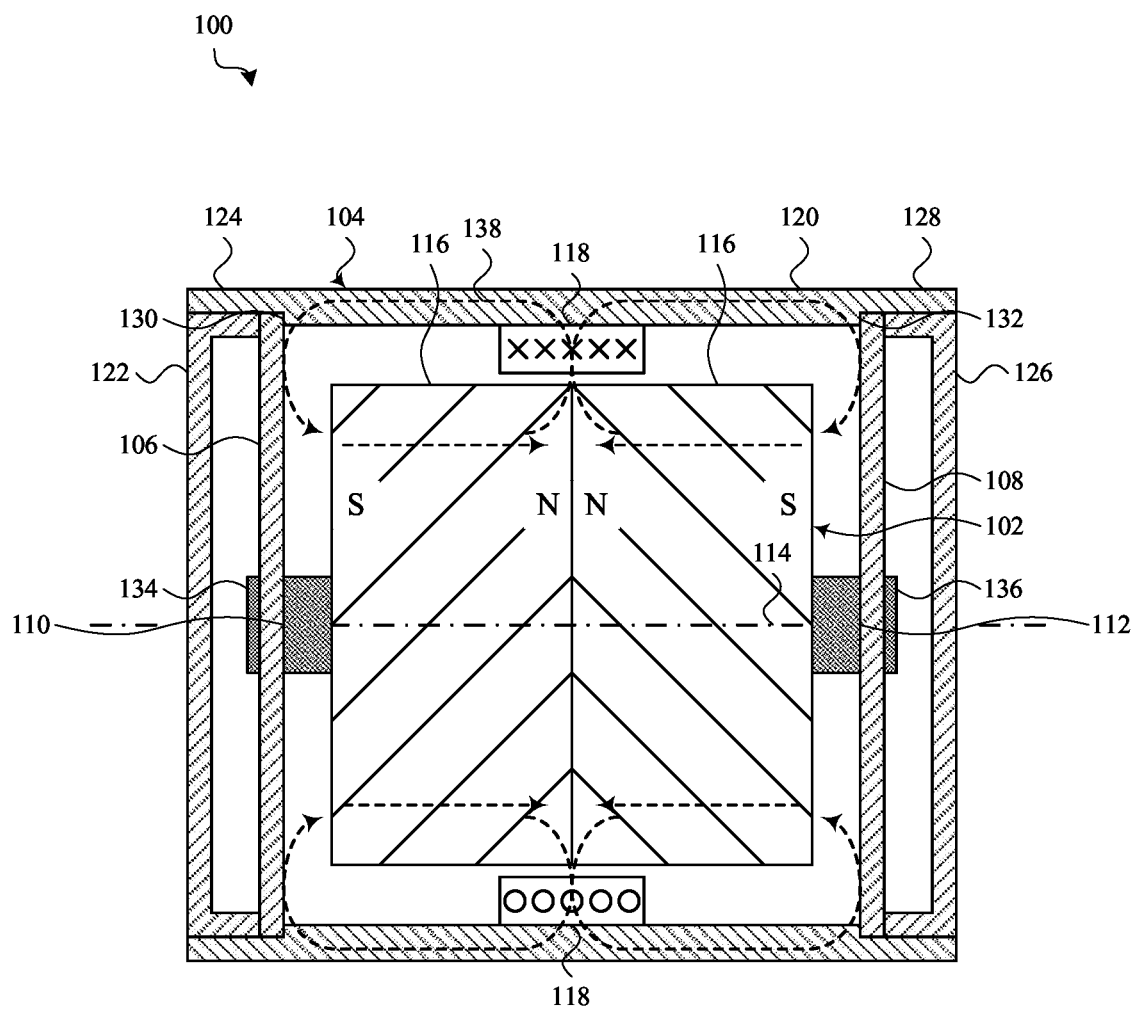

FIGS. 1A and 1B show an example LRA 100. FIG. 1A shows an isometric view of the LRA 100, and FIG. 1B shows a cross-section of the LRA 100 along cutline IB-IB. The LRA 100 includes a movable mass 102 suspended from or within a frame 104. In some embodiments, the movable mass 102 may be housed by or enclosed within the frame 104 (e.g., as shown).

In some embodiments, the frame 104 may have a tubular main body section 120 that is ferritic. The frame 104 may also include an optional first end cap 122 attached to a first end 124 of the main body section 120, and an optional second end cap 126 attached to a second end 128 of the main body section 120. The first and second end caps 122, 126 may be non-ferritic or mildly ferritic, to avoid attracting the movable mass 102. By way of example, the main body section 120 may have a stepped profile near each of the first and second ends 124, 128, such that a ring-shaped shelf (130 or 132) is defined at each of the first and second ends 124, 128 of the main body section 120. Each of the first and second end caps 122, 126 may have an outer diameter that is the same as, or slightly smaller than, the larger inner diameter of the main body section 120, such that the first end cap 122 may slide into the first end 124 of the main body section 120, and the second end cap 126 may slide into the second end 128 of the main body section 120. The ring-shaped shelves 130, 132 provide stops that prevent the first and second end caps 122, 126 from sliding farther into the main body section 120 than desired. In some cases, the first and second end caps 122, 126 may be held in place by welds, adhesive, clips, or friction (e.g., the first and second end caps 122, 126 may be press-fit into the first and second ends 124, 128 of the main body section 120), or other means. In various embodiments, the first and second end caps 122, 126 may be differently shaped, may be solid or have holes therein, or may attach to the main body section 120 in different ways.

The movable mass 102 may be attached to the frame 104, and suspended from or within the frame 104, by a set of flexures 106, 108 (e.g., non-ferritic or mildly ferritic flexures). A first flexure 106 may mechanically couple a first end 110 of the movable mass 102 to the frame 104. A second flexure 108 may mechanically couple a second end 112 of the movable mass 102 to the frame 104. Each flexure 106, 108 may be attached to the movable mass 102 by one or more of a weld, adhesive, clip, fastener (e.g., bolt and spacer 134 or 136), and so on. In embodiments in which the frame 104 includes the main body section 120 and first and second end caps 122, 126, the first flexure 106 may have one or more portions (e.g., tabs or an entire outer perimeter) that extend between the main body section 120 and the first end cap 122 and seat against the ring-shaped shelf 130. Similarly, the second flexure 108 may have one or more portions (e.g., tabs or an entire perimeter) that extend between the main body section 120 and the second end cap 126 and seat against the ring-shaped shelf 132.

The set of flexures 106, 108 allow movement of the movable mass 102 along an axis 114 extending through the first and second ends 110, 112 of the movable mass 102, and provide restorative forces that bias the movable mass 102 to a rest position. In some cases, the flexures 106, 108 may constrain movement of the movable mass 102 to movement along the axis 114 (though the movement along the axis 114 may be subject to deviation due to real world tolerances (e.g., manufacturing variation and so on)).

In some embodiments, the movable mass 102 may be axisymmetric about the axis 114. The flexures 106, 108 may also be axisymmetric about the axis 114, and may be coupled to the movable mass 102 in an axisymmetric manner (e.g., coupled to the movable mass 102 along the axis 114, or to attachment points on the movable mass 102 that are symmetrically distributed about the axis 114. In some cases, additional components of the LRA 100, or all of the LRA 100, may be configured or coupled in an axisymmetric manner.

The movable mass 102 may include a set of magnet sections 116. The magnet sections 116 may take the form of individual magnets (e.g., magnet sections 116 having donut-shaped or round cross-sections perpendicular to the axis 114), or magnetized portions of a monolithic material (e.g., a cylindrical-shaped material). By way of example, the movable mass 102 has two magnet sections 116. Each magnet section 116 may be disposed at a different position along the axis 114. Each magnet section 116 may have a pair of opposite magnetic poles (e.g., a north (N) pole and a south (S) pole). The opposite magnetic poles of a magnet section 116 may be disposed at different positions along the axis 114. Like magnetic poles of adjacent magnet sections 116 may face each other.

The LRA 100 may further include a set of one or more electric coils 118. Each electric coil 118 may be fixed with respect to the frame 104 and/or attached to the frame 104. Each electric coil 118 may extend around the movable mass 102. Each electric coil 118 may be positioned between the frame and the movable mass 102.

When a current is driven through the electric coil 118, magnetic flux 138 may flow in a generally axial direction through the magnet sections 116, and into or out of the electric coil 118, and then be recycled through the tubular main body section 120 of the frame 104 before returning to the magnet sections 116. The magnetic flux 138 may change direction responsive to a change in the direction of current flow through the electric coil 118. The ferritic tubular main body section 120 helps shorten the magnetic flux path and improve magnetic flux recycling (e.g., compared to magnetic flux traveling through air).

Figure 2:
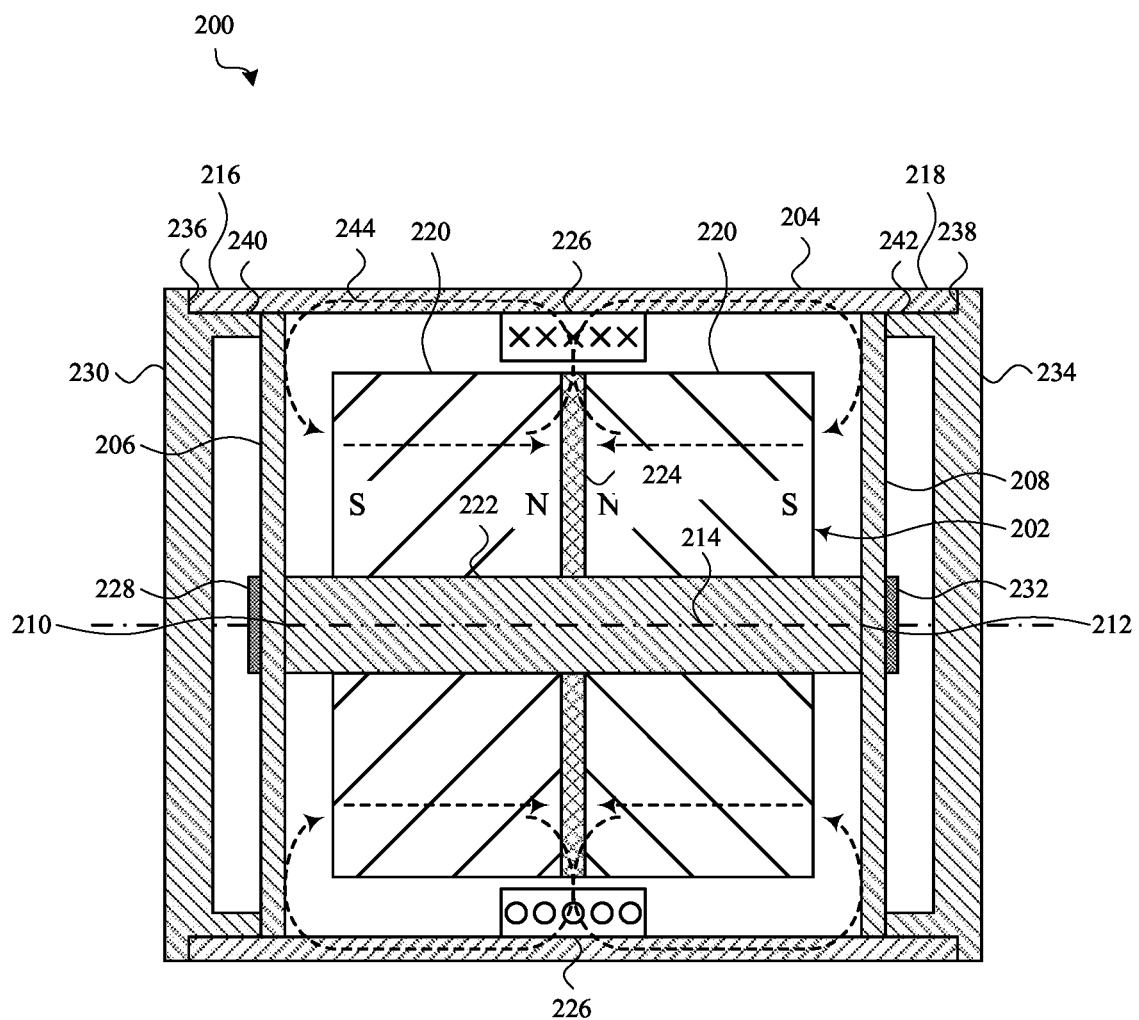
FIG. 2 shows a cross-section of a second example of an LRA.

FIG. 2 shows a cross-section of an example LRA 200. The LRA 200 is an example of the LRA described with reference to FIGS. 1A and 1B. The LRA 200 includes a movable mass 202 suspended from or within a ferritic tube 204. The ferritic tube 204 is an example of the frame described with reference to FIGS. 1A and 1B. In some embodiments, the movable mass 202 may be housed by or enclosed within the ferritic tube 204 (e.g., as shown).

In some embodiments, the ferritic tube 204 may have a first end 216 that receives an optional first end cap 230, and a second end 218 that receives an optional second end cap 234. The first and second end caps 230, 234 may be non-ferritic or mildly ferritic, to avoid attracting the movable mass 202. By way of example, each of the first and second end caps 230, 234 may have a stepped profile around its perimeter, such that a ring-shaped shelf (236 or 238) is defined by each of the first and second end caps 230, 234. An exterior wall 240, 242 of each end cap 230, 234, which exterior wall 240, 242 intersects the end cap's ring-shaped shelf 236, 238, may have a diameter that is the same as, or slightly smaller than, the inner diameter of the ferritic tube 204, such that the first end cap 230 may slide into the first end 216 of the ferritic tube 204, and the second end cap 234 may slide into the second end 218 of the ferritic tube 204. The ring-shaped shelves 236, 238 provide stops that prevent the first and second end caps 230, 234 from sliding farther into the ferritic tube 204 than desired. In some cases, the first and second end caps 230, 234 may be held in place by welds, adhesive, clips, or friction (e.g., the first and second end caps 230, 234 may be press-fit into the first and second ends 216, 218 of the ferritic tube 204), or other means. In various embodiments, the first and second end caps 230, 234 may be differently shaped, may be solid or have holes therein, or may attach to the ferritic tube 204 in different ways.

The movable mass 202 may be attached to the ferritic tube 204, and suspended from or within the ferritic tube 204, by a set of flexures 206, 208 (e.g., non-ferritic or mildly ferritic flexures). A first flexure 206 may mechanically couple a first end 210 of the movable mass 202 to the ferritic tube 204. A second flexure 208 may mechanically couple a second end 212 of the movable mass 202 to the ferritic tube 204. Each flexure 206, 208 may be attached to the movable mass 202 by one or more of a weld, adhesive, clip, fastener (e.g., bolt 228 or 232), and so on. The first flexure 206 may have one or more portions (e.g., tabs or an entire outer perimeter) that are welded or otherwise bonded to the first end cap 230. Similarly, the second flexure 208 may have one or more portions (e.g., tabs or an entire perimeter) that are welded or otherwise bonded to the second end cap 234. By way of example, the first and second flexures 206, 208 are shown to have planar rest states perpendicular to the axis 214. In other embodiments, the first and second flexures 206, 208 may have expanded three-dimensional rest states perpendicular to the axis 214.

The set of flexures 206, 208 allow movement of the movable mass 202 along an axis 214 extending from a first end 216 of the ferritic tube 204 to a second end 218 of the ferritic tube 204, through the first and second ends 210, 212 of the movable mass 202. In some cases, the flexures 206, 208 may constrain movement of the movable mass 202 to movement along the axis 214 (though the movement along the axis 214 may be subject to deviation due to real world tolerances (e.g., manufacturing variation and so on)).

In some embodiments, the movable mass 202 may be axisymmetric about the axis 214. The flexures 206, 208 may also be axisymmetric about the axis 214, and may be coupled to the movable mass 202 in an axisymmetric manner (e.g., coupled to the movable mass 202 along the axis 214, or to attachment points on the movable mass 202 that are symmetrically distributed about the axis 214. in some cases, additional components of the LRA 200, or all of the LRA 200, may be configured or coupled in an axisymmetric manner.

The movable mass 202 may include a set of magnet sections 220. The magnet sections 220 may take the form of individual magnets (e.g., magnet sections 220 having donut-shaped or ring-like cross-sections perpendicular to the axis 214), or magnetized portions of a monolithic material (e.g., a cylindrical-shaped material). By way of example, the movable mass 202 is shown to have two magnet sections 220, each of which is a separate magnet having a donut shape. A core 222 (e.g., a cylindrical-shaped core) is inserted through the hole in each magnet section 220, and through a hole in a spacer 224 disposed between the magnet sections 220. In some cases, each magnet section 220 and spacer 224 may surround or encircle the core 222. Although each magnet section 220 and the spacer 224 is shown to be solid, but for its central hole, some or all of the one or more magnet sections 220 and/or spacer 224 may have perforations or channels, in addition to a central hole for receiving the core 222, in some embodiments. The spacer 224 may be axisymmetric or donut-shaped, and in some cases may have a cross-section perpendicular to the axis 214 that is the same or similar to the cross-sections of the magnet sections 220. The core 222 and spacer 224 may be ferritic, non-ferritic, or mildly ferritic. In some embodiments, the core 222 may be non-ferritic or mildly ferritic (e.g., formed of steel, 301 type stainless steel, or tungsten), which can enable higher frequency operation of the LRA 200, and the spacer 224 may be ferritic (e.g., formed of iron). The magnet sections 220 and spacer 224 may be attached to the core 222 by welds, adhesive, clips, or friction (e.g., the magnet sections 220 and spacer 224 may be press-fit onto the core 222), or other means.

Each magnet section 220 may be disposed at a different position along the axis 214. Each magnet section 220 may have a pair of opposite magnetic poles (e.g., a north (N) pole and a south (S) pole). The opposite magnetic poles of a magnet section 220 may be disposed at different positions along the axis 214. Like magnetic poles of adjacent magnet sections 220 may face each other.

By way of example, the first and second flexures 206, 208 are shown attached to the movable mass 202 by means of bolts 240, 242 that thread into the core 222 and sandwich one or more portions (e.g., tabs or an entire inner perimeter) between a head of a respective bolt 240 or 242 and a respective end of the core 222.

The LRA 200 may further include a set of one or more electric coils 226. Each electric coil 226 may be fixed with respect to the ferritic tube 204 and/or attached to the ferritic tube 204. Each electric coil 226 may extend around the movable mass 202. Each electric coil 226 may be positioned between the ferritic tube 204 and the movable mass 202. By way of example, the set of electric coils 226 is shown to include one electric coil 226, which electric coil 226 may be positioned over and/or centered with respect to the spacer 224.

When a current is driven through the electric coil 226, magnetic flux 244 may flow in a generally axial direction through the magnet sections 220, and into or out of the electric coil 226, and may be recycled through the ferritic tube 204 before being returned to the magnet sections 220.

The magnetic flux 244 may change direction responsive to a change in the direction of current flow through the electric coil 226. The ferritic tube 204 helps shorten the magnetic flux path and improve magnetic flux recycling (e.g., compared to magnetic flux traveling through air). The ferritic spacer 224 may help improve the channeling of magnetic flux 244 between the magnet sections 220, and direct magnetic flux 244 into or out of the electric coil 226. The non-ferritic or mildly ferritic core 222 helps prevent loss of magnetic flux 244 in the core 222 and increases magnetic flux 244 through the electric coil 226.

Figure 3:
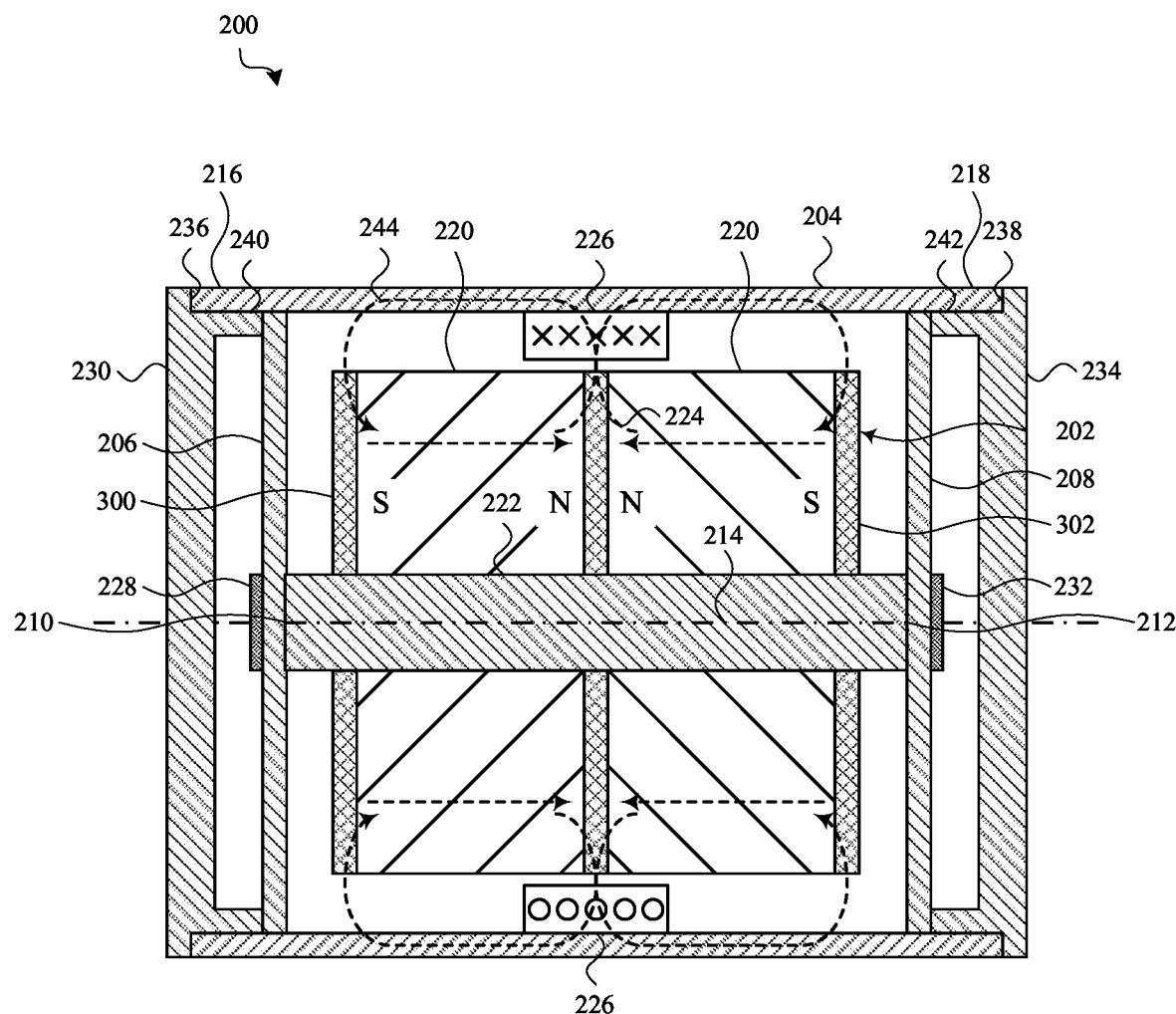
FIG. 3 shows an alternative embodiment of the LRA described with reference to FIG. 2.

FIG. 3 shows an alternative embodiment of the LRA 200. In the alternative embodiment, the movable mass 202 further includes a first disc 300 and a second disc 302. The first and second discs 300, 302 may be axisymmetric about the axis 214, and may have holes through which the core 222 extends. A first magnet section 220 may be positioned between the first disc 300 and the spacer 224, and a second magnet section 220 may be positioned between the second disc 302 and the spacer 224. The first and second discs 300, 302 may be ferritic, non-ferritic, or mildly ferritic. In some cases, the first and second discs 300, 302 may be ferritic, to help channel the magnetic flux 244. The first and second discs 300, 302 may be attached to the core 222 by welds, adhesive, clips, friction (e.g., the first and second discs 300, 302 may be press-fit onto the core 222), or other means. The first and second discs 300, 302 may have diameters that are the same as or larger than the diameter of the spacer 224.

In some embodiments, the diameters of the first and second discs 300, 302, perpendicular to the axis 214, may be greater than a diameter of any magnet section 220 in the set of magnet sections 220. In some cases, the diameters of the first and second discs 300, 302 may each be the same as, or about the same as, the inner diameter of the ferritic tube 204. In these latter embodiments, the first and second discs 300, 302 may help stabilize the movable mass 202 within the ferritic tube 204. When the diameters of the first and second discs 300, 302 are smaller than the inner diameter of the ferritic tube 204 (and even when the diameters are the same as, or about the same as, the inner diameter of the ferritic tube 204), the first and second discs 300, 302 may provide extra mass to the movable mass 202. The extra mass may increase the magnitude of the haptic effect produced by the LRA 200. In some embodiments, the discs 300, 302 may be formed of, or include, tungsten.

In some cases, the discs 300, 302 may be incorporated into the LRA described with reference to FIGS. 1A and 1B.

Figure 4:
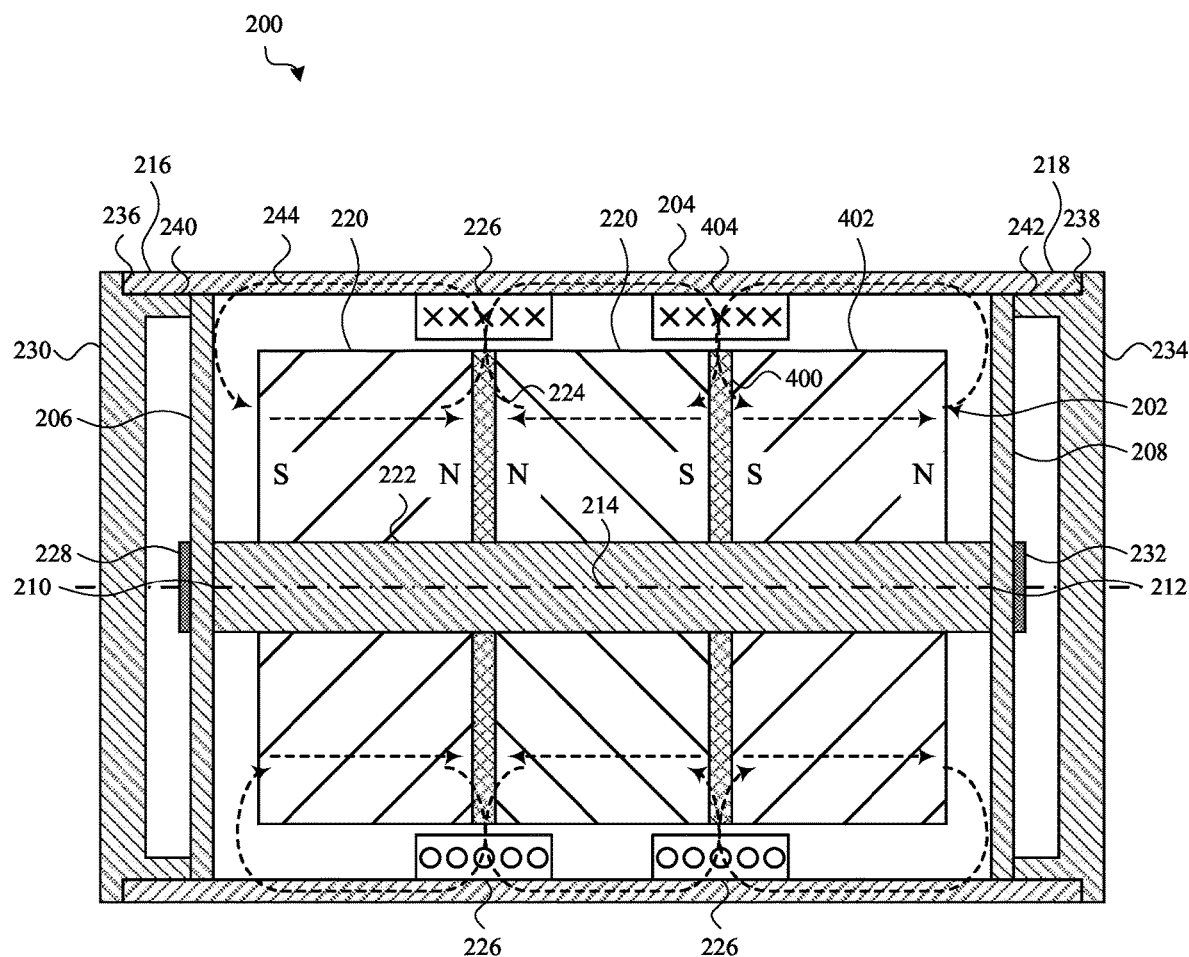
FIG. 4 shows another alternative embodiment of the LRA described with reference to FIG. 2.

FIG. 4 shows another alternative embodiment of the LRA 200, in which the movable mass 202 includes a second spacer 400 and a third magnet section 402. The third magnet section 402 may be separated from one of the magnet sections 220 by the spacer 400. The magnet sections 220 and 402 may be constructed the same or similarly, and the spacers 224 and 400 may be constructed the same or similarly. A second electric coil 404 in the set of electric coils 226 may be fixed with respect to the ferritic tube 204 and/or attached to the ferritic tube 204, and may extend around the movable mass 202. The second electric coil 404 may be positioned between the ferritic tube 204 and the movable mass 202, and may be positioned over and/or centered with respect to the second spacer 400.

Applying the principles described with reference to FIG. 4, a set of magnet sections 220, 402 included in a movable mass 202 may include any number of two or more magnet sections. A set of spacers 224, 400 included in a movable mass 202 may include any number of one or more spacers, with each spacer being disposed between a pair of adjacent magnet sections. A set of electric coils 226, 404 included in a LRA, which LRA includes a movable mass, may be any number of one or more electric coils, with each electric coil being positioned over and/or centered with respect to a respective spacer.

Figure 5:
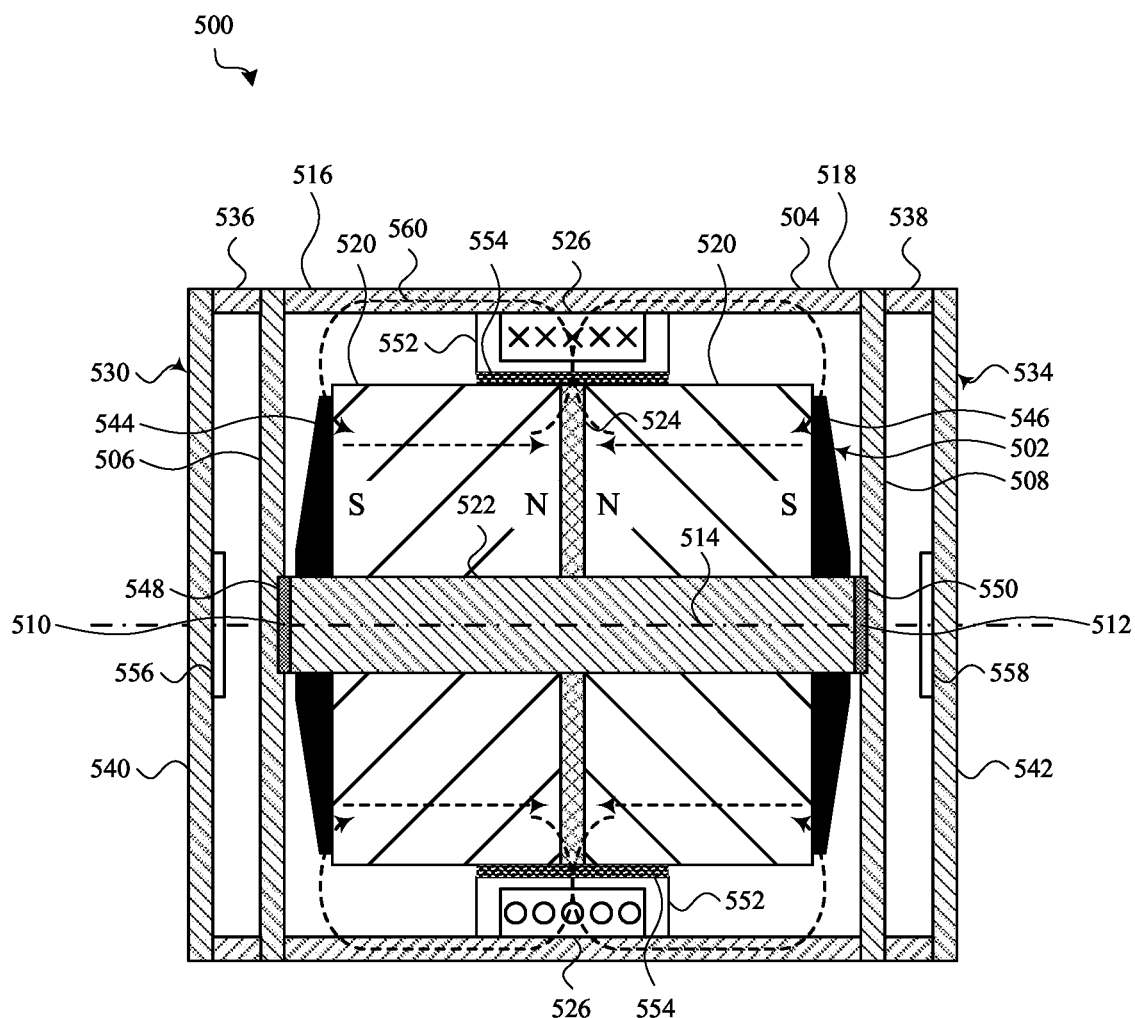
FIG. 5 shows a cross-section of a third example of an LRA.

FIG. 5 shows a cross-section of an example LRA 500. The LRA 500 is an example of the LRAs described with reference to FIGS. 1A, 1B, 2, and 3. The LRA 500 includes a movable mass 502 suspended from or within a ferritic tube 504. The ferritic tube 504 is an example of the frame described with reference to FIGS. 1A and 1B. In some embodiments, the movable mass 502 may be housed by or enclosed within the ferritic tube 504 (e.g., as shown).

In some embodiments, the ferritic tube 504 may have a first end 516 to which an optional first end cap 530 is attached, and a second end 518 to which an optional second end cap 534 is attached. By way of example, each of the first and second end caps 530, 534 is shown to have a two-part construction, with a ring (536 or 538) attached to a plate (540 or 542). Each plate 540, 542 may or may not have an outer wall or lip extending therefrom. In various embodiments, the first and second end caps 530, 534 may only include the rings 536, 538, or a respective ring 536, 538 and plate 540, 542, and may be formed as a monolithic structure or attached to each other prior to their attachment to the ferritic tube 504. Each ring 536, 538 may have a diameter that is the same as, or slightly larger than, the diameter of the ferritic tube 504, such that the first ring 536 may abut the first end 516 of the ferritic tube 504, and the second ring 538 may abut the second end 518 of the ferritic tube 504. Each of the first and second rings 536, 538 and first and second plates 540, 542 may be non-ferritic or mildly ferritic, to avoid attracting the movable mass 502. In various embodiments, the first and second end caps 530, 534 may be differently shaped, may be solid, or may have holes therein.

The movable mass 502 may be attached to the ferritic tube 504, and suspended from or within the ferritic tube 504, by a set of flexures 506, 508 (e.g., non-ferritic or mildly ferritic flexures). A first flexure 506 may mechanically couple a first end 510 of the movable mass 502 to the ferritic tube 504. A second flexure 508 may mechanically couple a second end 512 of the movable mass 502 to the ferritic tube 504. Each flexure 506, 508 may be attached to the movable mass 502 by one or more of a weld, adhesive, clip, fastener, and so on. The first flexure 506 may have one or more portions (e.g., tabs or an entire outer perimeter) that extend between the ferritic tube 504 and the first end cap 530 and are sandwiched between the ferritic tube 504 and the first end cap 530. Similarly, the second flexure 508 may have one or more portions (e.g., tabs or an entire perimeter) that extend between the ferritic tube 504 and the second end cap 534 and are sandwiched between the ferritic tube 504 and the second end cap 534. By way of example, the first and second flexures 506, 508 are shown to have planar rest states perpendicular to the axis 514. In other embodiments, the first and second flexures 506, 508 may have expanded three-dimensional rest states perpendicular to the axis 514.

Respective ones of the first and second rings 536, 538 and first and second flexures 506, 508 may be attached to the ferritic tube 504 by welds, adhesive, clips, or other means.

The set of flexures 506, 508 allow movement of the movable mass 502 along an axis 514 extending from a first end 516 of the ferritic tube 504 to a second end 518 of the ferritic tube 504, through the first and second ends 510, 512 of the movable mass 502. In some cases, the flexures 506, 508 may constrain movement of the movable mass 502 to movement along the axis 514 (though the movement along the axis 514 may be subject to deviation due to real world tolerances (e.g., manufacturing variation and so on)).

In some embodiments, the movable mass 502 may be axisymmetric about the axis 514. The flexures 506, 508 may also be axisymmetric about the axis 514, and may be coupled to the movable mass 502 in an axisymmetric manner (e.g., coupled to the movable mass 502 along the axis 514, or to attachment points on the movable mass 502 that are symmetrically distributed about the axis 514. In some cases, additional components of the LRA 500, or all of the LRA 500, may be configured or coupled in an axisymmetric manner.

The movable mass 502 may include a set of magnet sections 520. The magnet sections 520 may take the form of individual magnets (e.g., magnet sections 520 having donut-shaped or ring-like cross-sections perpendicular to the axis 514), or magnetized portions of a monolithic material (e.g., a cylindrical-shaped material). By way of example, the movable mass 502 is shown to have two magnet sections 520, each of which is a separate magnet having a donut shape. A core 522 (e.g., a cylindrical-shaped core) is inserted through the hole in each magnet section 520, and through a hole in a spacer 524 disposed between the magnet sections 520. In some cases, each magnet section 520 and spacer 524 may surround or encircle the core 522. Although each magnet section 520 and the spacer 524 is shown to be solid, but for its central hole, some or all of the one or more magnet sections 520 and/or spacer 524 may have perforations or channels, in addition to a central hole for receiving the core 522, in some embodiments. The spacer 524 may be axisymmetric or donut-shaped, and in some cases may have a cross-section perpendicular to the axis 514 that is the same or similar to the cross-sections of the magnet sections 520. The core 522 and spacer 524 may be ferritic, non-ferritic, or mildly ferritic. In some embodiments, the core 522 may be non-ferritic or mildly ferritic (e.g., formed of steel, 301 type stainless steel, or tungsten), which can enable higher frequency operation of the LRA 500, and the spacer 524 may be ferritic (e.g., formed of iron). The magnet sections 520 and spacer 524 may be attached to the core 522 by welds, adhesive, clips, or friction (e.g., the magnet sections 520 and spacer 524 may be press-fit onto the core 522), or other means.

Each magnet section 520 may be disposed at a different position along the axis 514. Each magnet section 520 may have a pair of opposite magnetic poles (e.g., a north (N) pole and a south (S) pole). The opposite magnetic poles of a magnet section 520 may be disposed at different positions along the axis 514. Like magnetic poles of adjacent magnet sections 520 may face each other.

The movable mass 502 may also include a first disc 544 and a second disc 546. The first and second discs 544, 546 may be axisymmetric about the axis 514, and may have holes through which the core 522 extends. A first magnet section 520 may be positioned between the first disc 544 and the spacer 524, and a second magnet section 520 may be positioned between the second disc 546 and the spacer 524. The first and second discs 544, 546 may be ferritic, non-ferritic, or mildly ferritic. In some cases, the first and second discs 544, 546 may be ferritic, to help channel magnetic flux 560. The first and second discs 544, 546 may be attached to the core 522 by welds, adhesive, clips, friction (e.g., the first and second discs 544, 546 may be press-fit onto the core 522), or other means. The first and second discs 544, 546 may provide extra mass to the movable mass 502, and may therefore be referred to as mass-increasing discs. The extra mass may increase the magnitude of the haptic effect produced by the LRA 500. In some embodiments, the discs 544, 546 may be formed of, or include, tungsten.

By way of example, the first and second flexures 506, 508 are shown attached to the movable mass 502 by means of welds 548, 550 to the core 522.

The LRA 500 may further include a set of one or more electric coils 526. Each electric coil 526 may be fixed with respect to the ferritic tube 504 and/or attached to the ferritic tube 504. Each electric coil 526 may extend around the movable mass 502. Each electric coil 526 may be positioned between the ferritic tube 504 and the movable mass 502. By way of example, the set of electric coils 526 is shown to include one electric coil 526, which electric coil 526 may be positioned over and/or centered with respect to the spacer 524.

In some cases, the electric coil 526 may be wound around a dielectric ring 552 (e.g., a plastic ring). The dielectric ring 552 may serve as a carrier for the electric coil 526 and attached to the interior of the ferritic tube 504. The movable mass 502 may extend through the dielectric ring 552. The dielectric ring 552 may serve as a carrier for the electric coil 526. The dielectric ring 552 may also protect the electric coil 526 from potential abrasion by the movable mass 502.

In some cases, a ferrofluid 554 may be dispensed between the electric coil 526 and the movable mass 502, or between the dielectric ring 552 and the movable mass 502. The ferrofluid 554 may prevent the movable mass 502 from crashing into the dielectric ring 552 (or cushion the movable mass 502) in the event of a drop event or other shock to the LRA 500.

When a current is driven through the electric coil 526, magnetic flux 560 may flow in a generally axial direction through the magnet sections 520, and into or out of the electric coil 526, and may be recycled through the ferritic tube 504 before being returned to the magnet sections 520. The magnetic flux 560 may change direction responsive to a change in the direction of current flow through the electric coil 526. The ferritic tube 504 helps shorten the magnetic flux path and improve magnetic flux recycling (e.g., compared to magnetic flux traveling through air). The ferritic spacer 524 may help improve the channeling of magnetic flux 560 between the magnet sections 520, and direct magnetic flux 560 into or out of the electric coil 526. The non-ferritic or mildly ferritic core 522 helps prevent loss of magnetic flux 560 in the core 522 and increases magnetic flux 560 through the electric coil 526.

In some embodiments, a crash stop or cushion 556, 558 may be attached (e.g., glued) to the interior of each plate 540, 542 (i.e., between the plate 540 (or end cap 530) and the movable mass 502, or between the plate 542 (or end cap 534) and the movable mass 502). The cushions 556, 558 may mechanically and electrically protect the movable mass 502 and first and second plates 540, 542 in the event of a drop, overcurrent applied to the electric coil 526, or the like, by preventing metal-to-metal contact between the movable mass and first or second plate 540, 542. In some cases, the cushions 556, 558 may be formed of plastic.

Figure 6A:
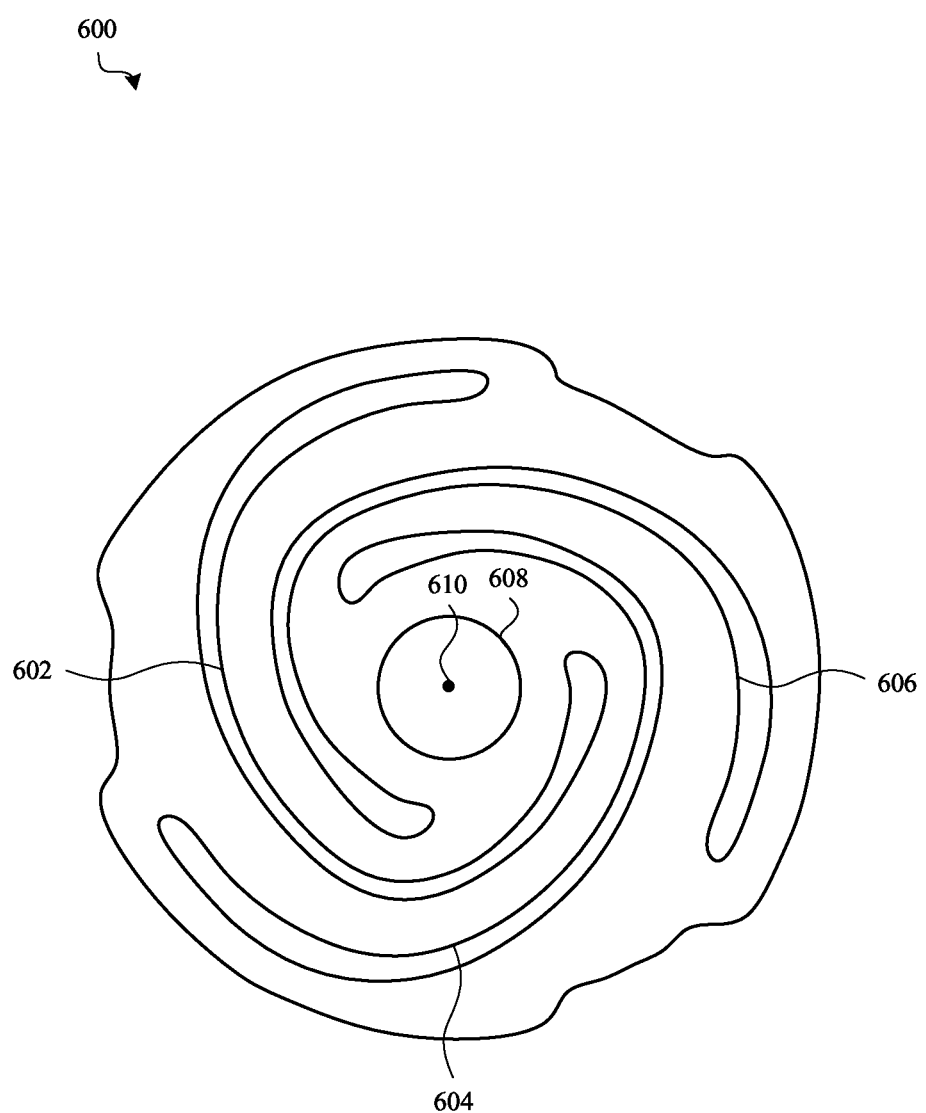
FIG. 6A shows an example of a flexure having a planar rest state.
Figure 7:
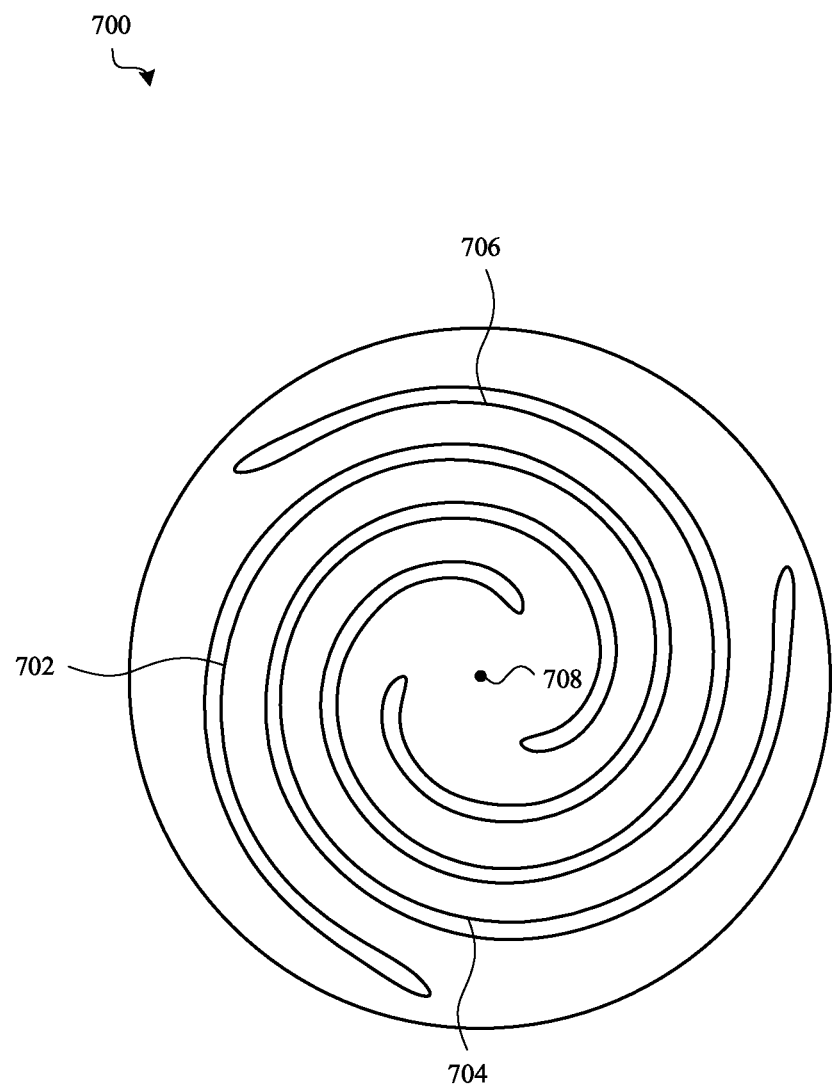
FIG. 7 shows another example of a flexure having a planar rest state.

FIGS. 6A and 7 show plan views of example flexures. In some cases, the flexures may be the flexures described with reference to FIG. 1A, 1B, 2, 3, 4, or 5.

As shown in FIG. 6A, the flexure 600 may have a set of arms 602, 604, 606, each arm of which has a trajectory that spirals around a central hole 608 and axis 610. Each of the arms 602, 604, 606 may have an outward portion (or distal end) near the outer perimeter of the flexure 600, and an inward portion (or proximal end) near the inner perimeter of the flexure 600. The arms 602, 604, 606 may be connected to each other at their outward portions or distal ends and, separately, at their inward portions or proximal ends. Each arm 602, 604, 606 may have a wider distal end and proximal end, and a middle portion having a width that is smaller than those of the distal and proximal ends.

Figure 6B:
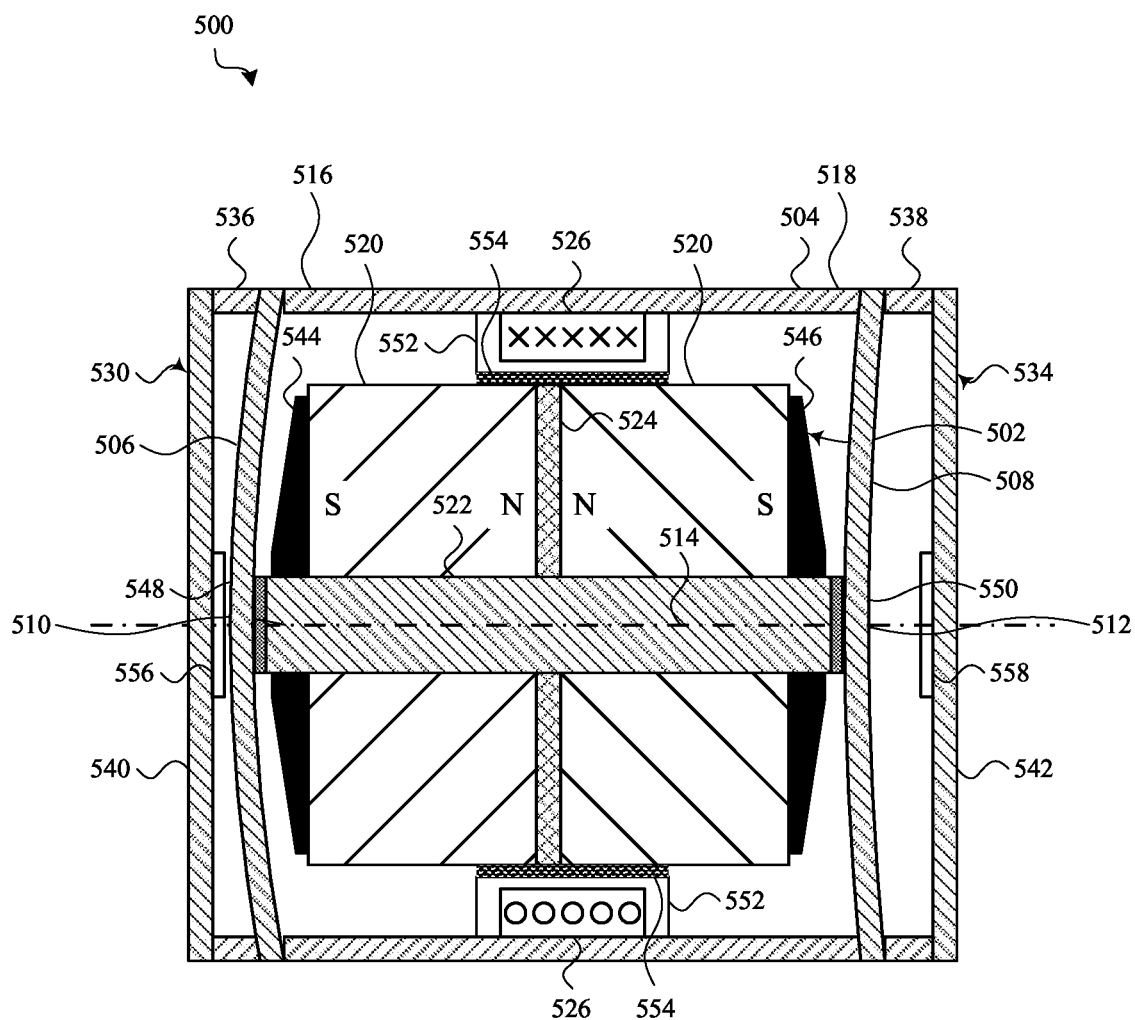
FIG. 6B illustrates an example movement of the movable mass shown in FIG. 5, when flexures that attach the movable mass to a ferritic tube are configured as shown in FIG. 6A, and when a current having a first polarity is driven through an electric coil of the LRA.

FIG. 6B illustrates an example movement of the movable mass 502 shown in FIG. 5 when the flexures 506, 508 are configured as shown in FIG. 6A and a current having a first polarity is driven through the electric coil 526. As shown, the movable mass 502 may move to the left and the flexures 506, 508 may flex to allow the movement. When the polarity of the current through the electric coil 526 alternates or is switched to a second polarity, the movable mass 502 may move to the right. When no current is driven through the electric coil 526, the flexures 506, 508 may assume planar rest states, as shown in FIG. 5.

When the flexures 506, 508 are configured as shown in FIG. 6A, each flexure 506, 508 may be attached to the movable mass 502 with its arms 602, 604, 606 spiraling in the same direction. This helps constrain the movable mass 502 to a rifling movement about the axis 514 and helps stabilize the movable mass 502 (e.g., prevent wobble, which can cause performance to deteriorate and increase wear).

FIG. 7 shows another example of a flexure 700 having a planar rest state. The flexure 700 also has a set of arms 702, 704, 706, each arm of which has a trajectory that spirals around an axis 708. Each of the arms 702, 704, 706 may have an outward portion (or distal end) near the outer perimeter of the flexure 700, and an inward portion (or proximal end) near the inner perimeter of the flexure 700. The arms 702, 704, 706 may be connected to each other at their outward portions or distal ends and, separately, at their inward portions or proximal ends. Each arm 702, 704, 706 may have a wider distal end and proximal end, and a middle portion having a width that is smaller than those of the distal and proximal ends. However, the widths of the distal end, proximal end, and middle portion of each arm 702, 704, 706 may be more or less the same, and in some cases may be the same. In comparison to the arms of the flexure described with reference to FIG. 6A, each of the arms 702, 704, 706 has a longer length, which can increase the extension of the flexure 700.

Figure 8A:
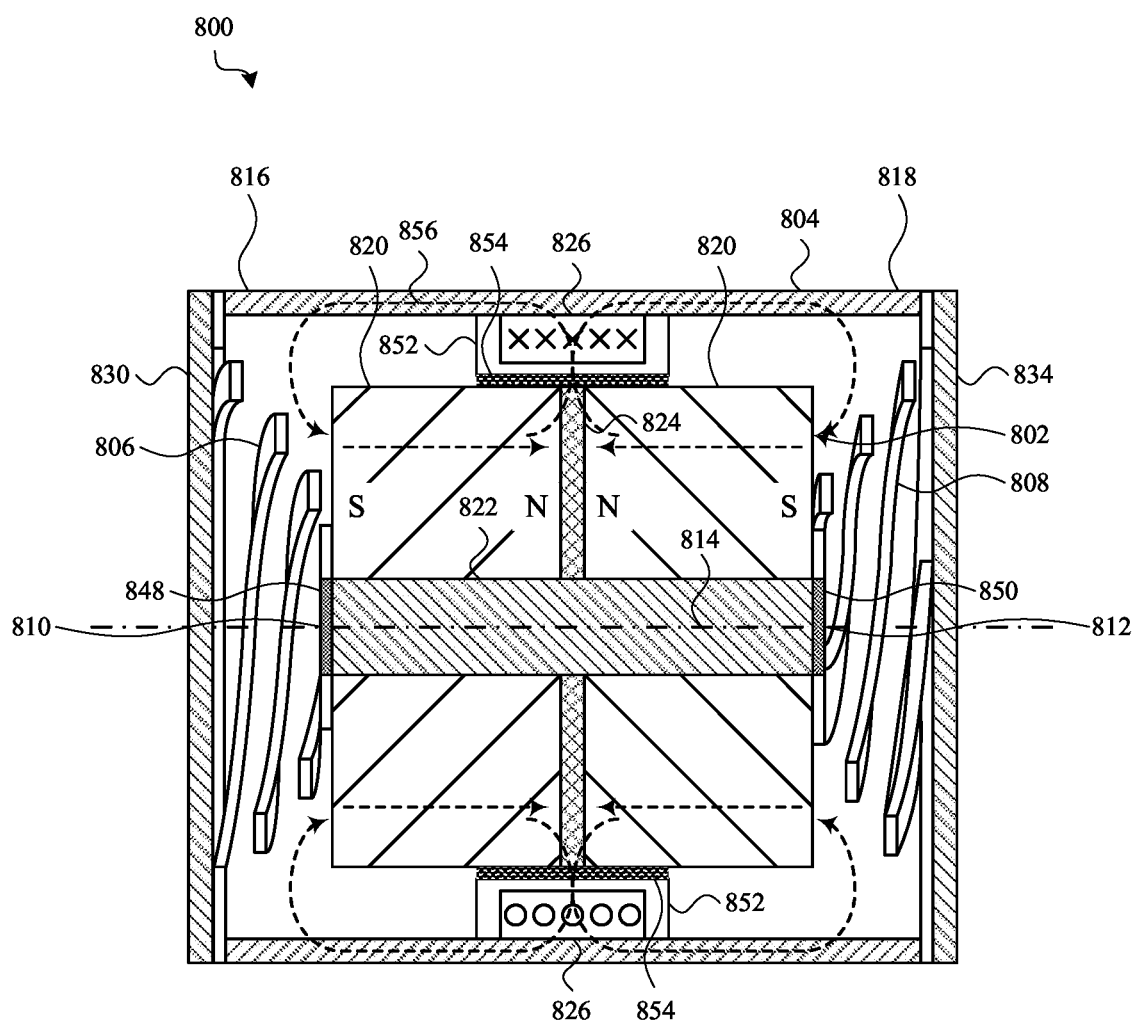
FIG. 8A shows a cross-section of a fourth example of an LRA.

FIG. 8A shows a cross-section of an example LRA 800. The LRA 800 is an example of the LRAs described with reference to FIGS. 1A, 1B, 2, and 3. The LRA 800 includes a movable mass 802 suspended from or within a ferritic tube 804. The ferritic tube 804 is an example of the frame described with reference to FIGS. 1A and 1B. In some embodiments, the movable mass 802 may be housed by or enclosed within the ferritic tube 804 (e.g., as shown).

In some embodiments, the ferritic tube 804 may have a first end 816 to which an optional first end cap 830 is attached, and a second end 818 to which an optional second end cap 834 is attached. Each of the first and second end caps 830, 834 may take the form of a plate, but could alternately take the form of any of the end caps described herein (or other forms). Each end cap 830, 834 may have a diameter that is the same as, or slightly larger than, the diameter of the ferritic tube 804, such that the first end cap 830 may abut the first end 816 of the ferritic tube 804, and the second end cap 834 may abut the second end 818 of the ferritic tube 804. Each of the first and second end caps 830, 834 may be non-ferritic or mildly ferritic, to avoid attracting the movable mass 802. In various embodiments, the first and second end caps 830, 834 may be differently shaped, may be solid, or may have holes therein.

The movable mass 802 may be attached to the ferritic tube 804, and suspended from or within the ferritic tube 804, by a set of flexures 806, 808 (e.g., non-ferritic or mildly ferritic flexures). A first flexure 806 may mechanically couple a first end 810 of the movable mass 802 to the ferritic tube 804. A second flexure 808 may mechanically couple a second end 812 of the movable mass 802 to the ferritic tube 804. Each flexure 806, 808 may be attached to the movable mass 802 by one or more of a weld, adhesive, clip, fastener, and so on. The first flexure 806 may have one or more portions (e.g., tabs or an entire outer perimeter) that extend between the ferritic tube 804 and the first end cap 830 and are sandwiched between the ferritic tube 804 and the first end cap 830. Similarly, the second flexure 808 may have one or more portions (e.g., tabs or an entire perimeter) that extend between the ferritic tube 804 and the second end cap 834 and are sandwiched between the ferritic tube 804 and the second end cap 834. By way of example, the first and second flexures 806, 808 are shown to have expanded three-dimensional rest states perpendicular to the axis 814. In some embodiments, each of the flexures 806, 808 may be formed similarly to the flexure described with reference to FIG. 7 (or FIG. 6), but may be forced into a three-dimensional state before or after its attachment to the movable mass 802 and the ferritic tube 804. For example, each of the flexures 806, 808 may be pre-deformed into a three-dimensional rest state prior to installation, or each of the flexures 806, 808 may be deformed into a three-dimensional rest state during installation (in which case each flexure 806, 808 may be under tension when the movable mass 802 is at rest). The use of flexures 806, 808 having three-dimensional rest states can enable a shortening of the LRA 800 in comparison to the LRA described with reference to FIG. 5, and in some cases can reduce the number of assembly steps for the LRA 800 (e.g., since rings need not be included in the end caps 830, 834.

Respective ones of the first and second end caps 830, 834 and first and second flexures 806, 808 may be attached to the ferritic tube 804 by welds, adhesive, clips, or other means.

The set of flexures 806, 808 allow movement of the movable mass 802 along an axis 814 extending from a first end 816 of the ferritic tube 804 to a second end 818 of the ferritic tube 804, through the first and second ends 810, 812 of the movable mass 802. In some cases, the flexures 806, 808 may constrain movement of the movable mass 802 to movement along the axis 814 (though the movement along the axis 814 may be subject to deviation due to real world tolerances (e.g., manufacturing variation and so on)).

In some embodiments, the movable mass 802 may be axisymmetric about the axis 814. The flexures 806, 808 may also be axisymmetric about the axis 814, and may be coupled to the movable mass 802 in an axisymmetric manner (e.g., coupled to the movable mass 802 along the axis 814, or to attachment points on the movable mass 802 that are symmetrically distributed about the axis 814. in some cases, additional components of the LRA 800, or all of the LRA 800, may be configured or coupled in an axisymmetric manner.

The movable mass 802 may include a set of magnet sections 820. The magnet sections 820 may take the form of individual magnets (e.g., magnet sections 820 having donut-shaped or ring-like cross-sections perpendicular to the axis 814), or magnetized portions of a monolithic material (e.g., a cylindrical-shaped material). By way of example, the movable mass 802 is shown to have two magnet sections 820 formed in a monolithic material (e.g., by selectively magnetizing different portions of the monolithic material). A core 822 (e.g., a cylindrical-shaped core) is inserted through the hole in the monolithic material. Although the monolithic material in which the magnet sections 820 are formed is shown to be solid, but for its central hole, the monolithic material may in some cases have perforations or channels, in addition to a central hole for receiving the core 822. The core 822 may be ferritic, non-ferritic, or mildly ferritic. In some embodiments, the core 822 may be non-ferritic or mildly ferritic (e.g., formed of steel, 301 type stainless steel, or tungsten), which can enable higher frequency operation of the LRA 800, and the spacer 824 may be ferritic (e.g., formed of iron). The monolithic material defining the magnet sections 820 may be attached to the core 822 by welds, adhesive, clips, or friction (e.g., the monolithic material may be press-fit onto the core 822), or other means.

Each magnet section 820 may be disposed at a different position along the axis 814. Each magnet section 820 may have a pair of opposite magnetic poles (e.g., a north (N) pole and a south (S) pole). The opposite magnetic poles of a magnet section 820 may be disposed at different positions along the axis 814. Like magnetic poles of adjacent magnet sections 820 may face each other.

By way of example, the first and second flexures 806, 808 are shown attached to the movable mass 802 by means of welds 848, 850 to the core 822.

The LRA 800 may further include a set of one or more electric coils 826. Each electric coil 826 may be fixed with respect to the ferritic tube 804 and/or attached to the ferritic tube 804. Each electric coil 826 may extend around the movable mass 802. Each electric coil 826 may be positioned between the ferritic tube 804 and the movable mass 802. By way of example, the set of electric coils 826 is shown to include one electric coil 826, which electric coil 826 may be positioned over and/or centered with respect to the spacer 824.

In some cases, the electric coil 826 may be wound around a dielectric ring 852 (e.g., a plastic ring). The dielectric ring 852 may serve as a carrier for the electric coil 826 and attached to the interior of the ferritic tube 804. The movable mass 802 may extend through the dielectric ring 852. The dielectric ring 852 may serve as a carrier for the electric coil 826. The dielectric ring 852 may also protect the electric coil 826 from potential abrasion by the moving mass 802.

In some cases, a ferrofluid 854 may be dispensed between the electric coil 826 and the movable mass 802, or between the dielectric ring 852 and the movable mass 802. The ferrofluid 854 may help channel magnetic flux 856.

When a current is driven through the electric coil(s) 826, magnetic flux 856 may flow in a generally axial direction through the magnet sections 820, and into or out of the electric coil 826, and may be recycled through the ferritic tube 804 before being returned to the magnet sections 820. The magnetic flux 856 may change direction responsive to a change in the direction of current flow through the electric coil 826. The ferritic tube 804 helps shorten the magnetic flux path and improve magnetic flux recycling (e.g., compared to magnetic flux traveling through air). The ferritic spacer 824 may help channel magnetic flux 856 between the magnet sections 820, and direct magnetic flux into or out of the electric coil 826. The non-ferritic or mildly ferritic core 822 helps prevent loss of magnetic flux 856 in the core 822 and increases magnetic flux 856 through the electric coil 826.

Figure 8B:
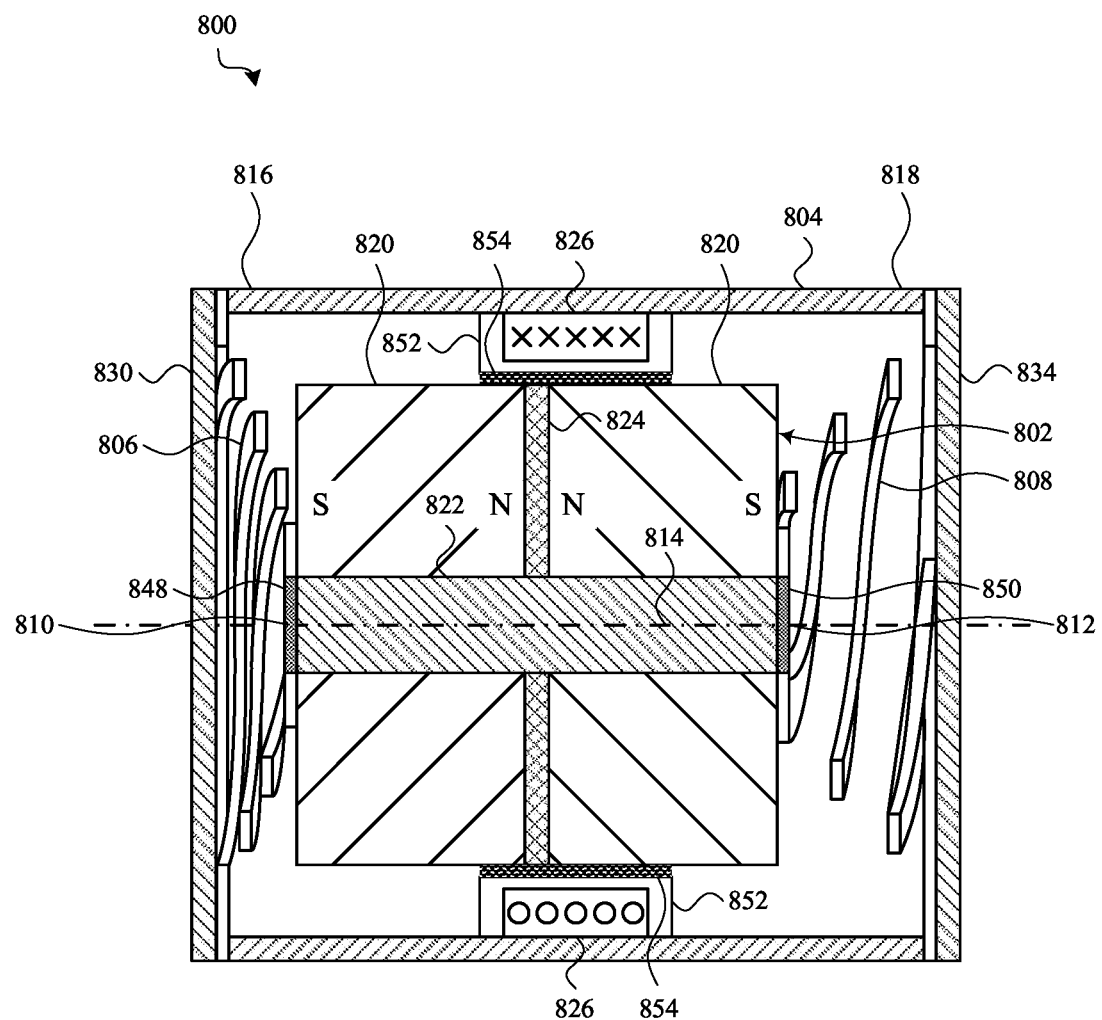
FIG. 8B illustrates an example movement of the movable mass shown in FIG. 8A, when a current having a first polarity is driven through an electric coil of the LRA.

FIG. 8B illustrates an example movement of the movable mass 802 shown in FIG. 8A when a current having a first polarity is driven through the electric coil 826. As shown, the movable mass 802 may move to the left and the flexures 806, 808 may flex to allow the movement. When the polarity of the current through the electric coil 826 alternates or is switched to a second polarity, the movable mass 802 may move to the right.

When the flexures 806, 808 are configured as shown in FIG. 7, each flexure 806, 808 may be attached to the movable mass 802 with its arms spiraling in the same direction. This helps constrain the movable mass 802 to a rifling movement about the axis 814 and helps stabilize the movable mass 802 (e.g., prevent wobble, which can cause performance to deteriorate and increase wear).

Figure 9:
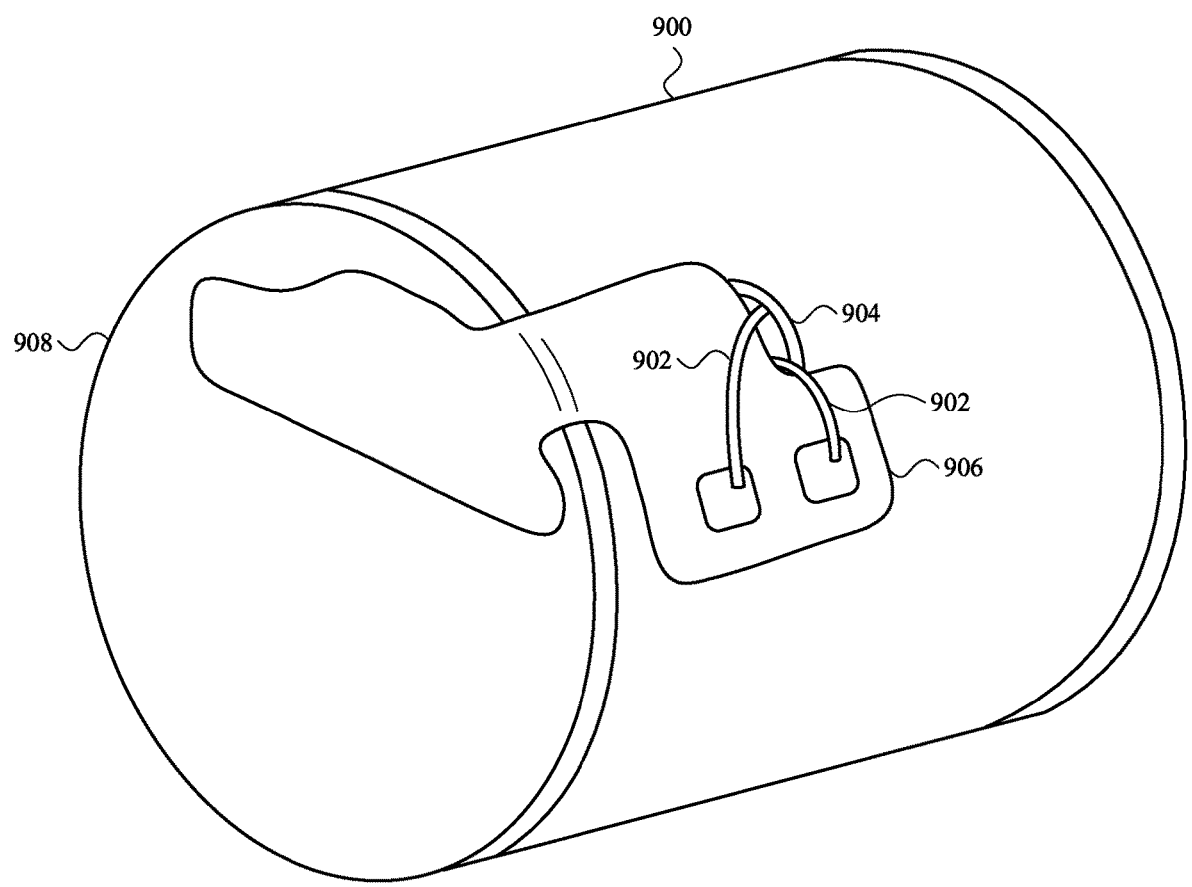
FIG. 9 shows an exterior isometric view of a frame, cylindrical body portion of an enclosure, or ferritic tube, as might be used to house any of the LRAs described with reference to FIG. 1A-5 or 8A-8B.

FIG. 9 shows an exterior isometric view of a frame and a cylindrical body portion of an enclosure having a cylindrical body portion or ferritic tube 900, as might be used to house any of the LRAs described with reference to FIG. 1A-5 or 8A-8B. As shown, the ends of the wire 902 that form an electric coil internal to the ferritic tube 900 may extend through a hole 904 in the ferritic tube 900 and electrically connect to a flexible circuit 906 that is conformed to a portion of an outer surface of the ferritic tube 900. In some cases, a portion of the flexible circuit 906 may also be folded and attached (or abutted) to an end cap 908 attached to one end of the ferritic tube 900.

Figure 10:
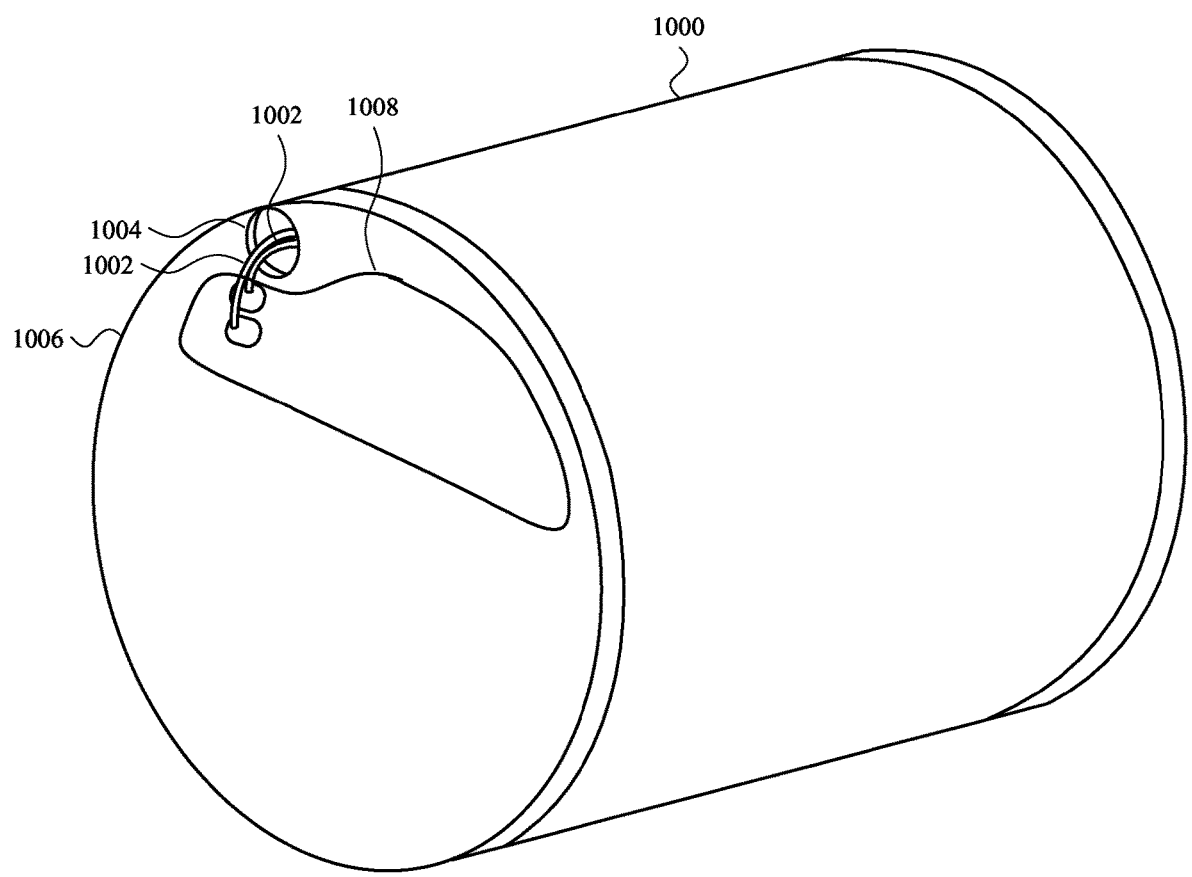
FIG. 10 shows an exterior isometric view of another frame, cylindrical body portion of an enclosure, or ferritic tube, as might be used to house any of the LRAs described with reference to FIG. 1A-5 or 8A-8B.

FIG. 10 shows an exterior isometric view of a frame and a cylindrical body portion of an enclosure having a cylindrical body portion or ferritic tube 1000, as might be used to house any of the LRAs described with reference to FIG. 1A-5 or 8A-8B. As shown, the ends of the wire 1002 that form an electric coil internal to the ferritic tube 1000 may extend through a hole 1004 formed in an end cap 1006 attached to the ferritic tube 1000. Alternatively, the hole 1004 may be formed partially or fully in the ferritic tube 1000, near the end cap 1006. The ends of the wire 1002 may be electrically connected to a flexible circuit 1008 that is attached (or abutted) to the end cap 1006.

Figure 11:
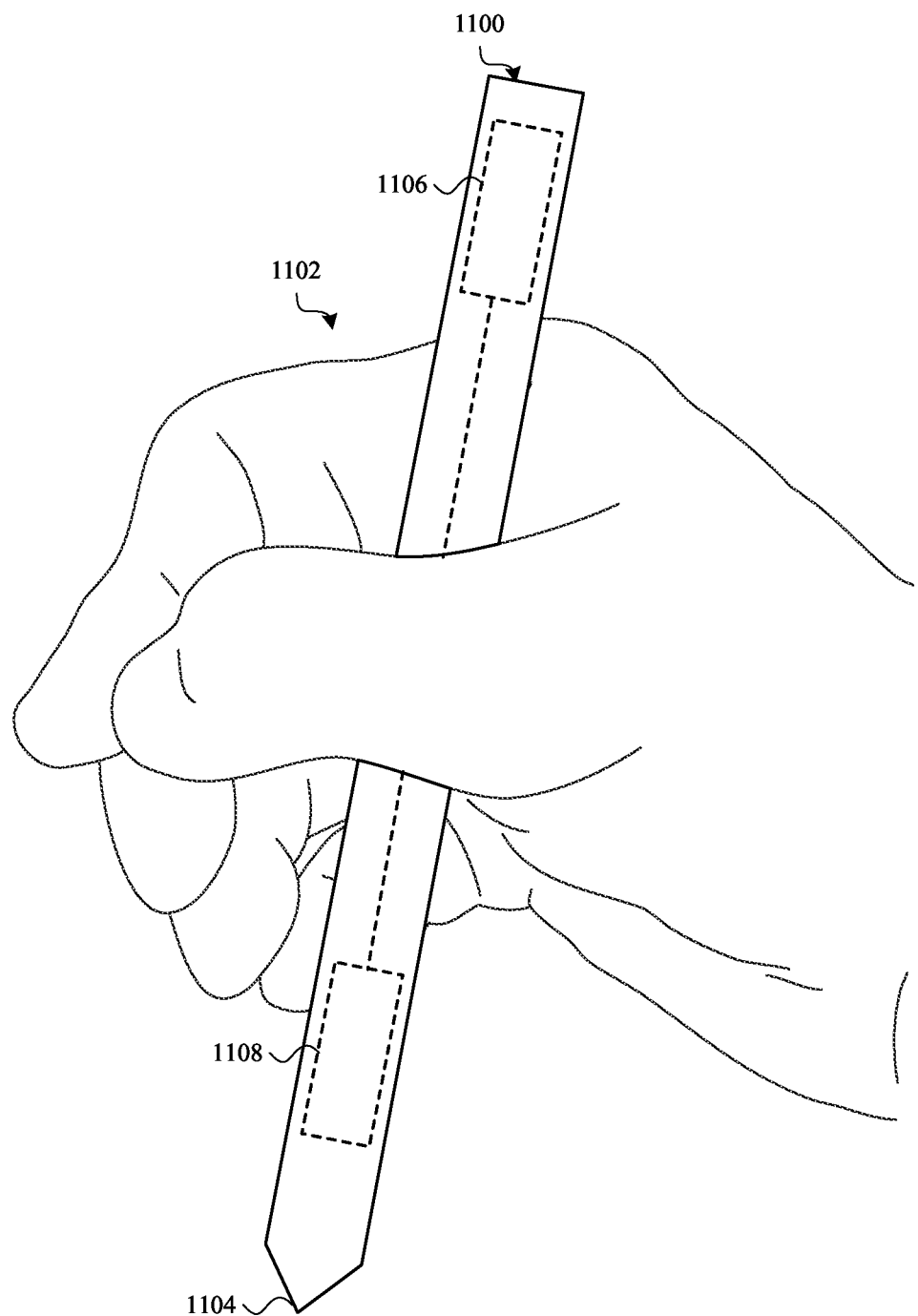

FIG. 11 shows an example of a stylus 1100, electronic pencil, or the like. The stylus 1100 may be held and manipulated by a user 1102 to provide input to an electronic device. In some cases, the position or movement of the stylus' tip 1104 may be sensed by an electronic device on which the tip 1104 is rested and moved. In some cases, the position or movement of the stylus' tip 1104 may be sensed by electronics 1106 (e.g., one or more sensors (e.g., an accelerometer, inertial sensor, optical sensor, and so on) and a processor) within the stylus 1100, and the sensed position or movement, or information derived from the sensed position or movement (e.g., characters drawn, object drawn, patterns traced, inputs selected, and so on), may be transmitted to a remote electronic device and/or indicated to the user via the stylus 1100.

The stylus 1100 may include an LRA 1108, including any of the LRAs described herein. The LRA 1108 may be actuated by the electronics 1106 (e.g., by a processor) to provide haptic feedback to the user 1102. A single type of haptic feedback may be provided, or different types of haptic feedback may be provided to indicate different things to the user 1102. Different types of haptic feedback may be provided, for example, by varying the frequency of actuation or actuating the LRA 1108 in accord with different haptic actuation waveforms. Different haptic actuation waveforms may have a series of actuations of the same or different length, at the same or different frequencies, separated by the same or different length pauses.

Haptic feedback may be provided to signal, for example, whether stylus input has been received; whether a letter or gesture traced by the stylus 1100 has been recognized; whether the stylus 1100 has triggered a button press or been moved to a particular position within a user interface; whether the user 1102 has moved the stylus 1100 outside of a bounded area; whether the user 1102 has moved the stylus 1100 over an actual or virtual surface having a particular texture; and so on.

The tubular and/or axisymmetric configurations of the LRAs described herein make them especially suitable for incorporation into the body of a stylus 1100, although the LRAs can be incorporated into any type of electronic device, such as mobile phones, computers, earbuds, watches, health and fitness monitors, touch screens, and so on.

As described with reference to FIG. 4, additional magnet sections and electric coils can be added to any of the LRAs described herein. Furthermore, the diameters of the magnet sections, widths of the magnet sections and spacers, resistance of the flexures, and various other parameters may be changed to tune the response of an LRA for a particular application.

Figure 12:
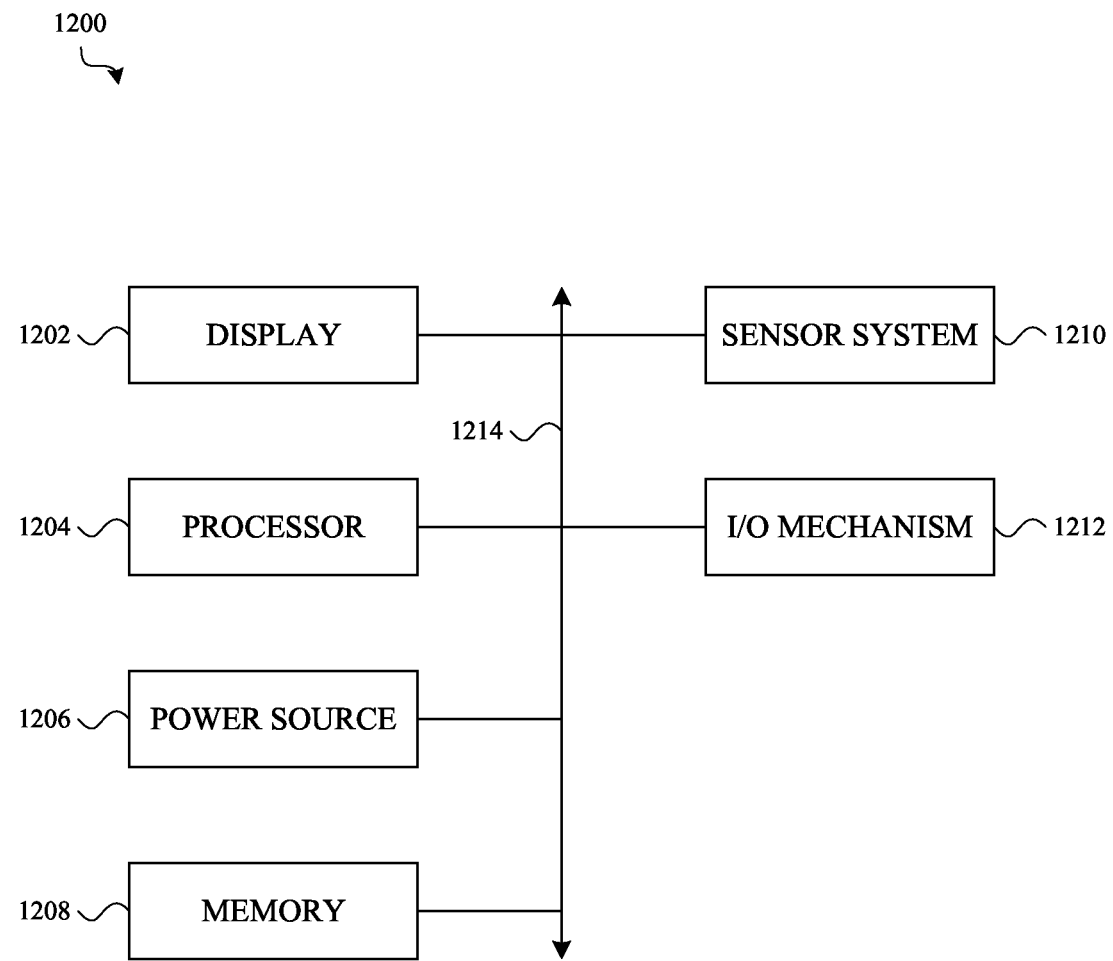
FIG. 12 shows an example block diagram of an electronic device.

FIG. 12 shows an example block diagram of an electronic device 1200, which in some cases may be the electronic device described with reference to FIG. 11, or another type of electronic device that includes one or more of the LRAs described herein. The electronic device 1200 may include an electronic display 1202 (e.g., a light-emitting display), a processor 1204, a power source 1206, a memory 1208 or storage device, a sensor system 1210, and/or an input/output (I/O) mechanism 1212 (e.g., an input/output device, input/output port, or haptic input/output interface). The processor 1204 may control some or all of the operations of the electronic device 1200. The processor 1204 may communicate, either directly or indirectly, with some or all of the other components of the electronic device 1200. For example, a system bus or other communication mechanism 1214 can provide communication between the electronic display 1202, the processor 1204, the power source 1206, the memory 1208, the sensor system 1210, and the I/O mechanism 1212.

The processor 1204 may be implemented as any electronic device capable of processing, receiving, or transmitting data or instructions, whether such data or instructions is in the form of software or firmware or otherwise encoded. For example, the processor 1204 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 1204 may provide part or all of the processing system or processor described herein.

It should be noted that the components of the electronic device 1200 can be controlled by multiple processors. For example, select components of the electronic device 1200 (e.g., the sensor system 1210) may be controlled by a first processor and other components of the electronic device 1200 (e.g., the electronic display 1202) may be controlled by a second processor, where the first and second processors may or may not be in communication with each other.

The power source 1206 can be implemented with any device capable of providing energy to the electronic device 1200. For example, the power source 1206 may include one or more batteries or rechargeable batteries. Additionally or alternatively, the power source 1206 may include a power connector or power cord that connects the electronic device 1200 to another power source, such as a wall outlet.

The memory 1208 may store electronic data that can be used by the electronic device 1200. For example, the memory 1208 may store electrical data or content such as, for example, timing signals, control signals, instructions, and/or data structures or databases. The memory 1208 may include any type of memory. By way of example only, the memory 1208 may include random access memory, read-only memory, Flash memory, removable memory, other types of storage elements, or combinations of such memory types.

The electronic device 1200 may also include one or more sensor systems 1210 positioned almost anywhere on the electronic device 1200. The sensor system(s) 1210 may be configured to sense one or more types of parameters, such as but not limited to, vibration; light; touch; force; heat; movement; relative motion; biometric data (e.g., biological parameters) of a user; air quality; proximity; position; connectedness; surface quality; and so on. By way of example, the sensor system(s) 1210 may include an SMI sensor, a heat sensor, a position sensor, a light or optical sensor, an image sensor (e.g., one or more of the image sensors or cameras described herein), an accelerometer, a pressure transducer, a gyroscope, a magnetometer, a health monitoring sensor, or an air quality sensor, and so on. Additionally, the one or more sensor systems 1210 may utilize any suitable sensing technology, including, but not limited to, interferometric, magnetic, capacitive, ultrasonic, resistive, optical, acoustic, piezoelectric, or thermal technologies.

The I/O mechanism 1212 may transmit or receive data from a user or another electronic device. The I/O mechanism 1212 may include the electronic display 1202, a touch sensing input surface, a crown, one or more buttons (e.g., a graphical user interface "home" button), one or more microphones or speakers, one or more ports such as a microphone port, and/or a keyboard. Additionally or alternatively, the I/O mechanism 1212 may transmit electronic signals via a communications interface, such as a wireless, wired, and/or optical communications interface. Examples of wireless and wired communications interfaces include, but are not limited to, cellular and Wi-Fi communications interfaces. The I/O mechanism 1212 may also include a haptic output device, such as one of the LRAs described herein.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A linear resonant actuator, comprising:
   a ferritic tube having an axis extending from a first end of the ferritic tube to a second end of the ferritic tube;
   a movable mass having a set of magnet sections disposed along the axis;
   a first flexure mechanically coupling a first end of the movable mass to the ferritic tube;
   a second flexure mechanically coupling a second end of the movable mass to the ferritic tube;
   a set of one or more electric coils attached to the ferritic tube and extending around the movable mass, between the ferritic tube and the movable mass; wherein,
   each magnet section in the set of magnet sections has magnetic poles disposed at different positions along the axis;
   like magnetic poles of adjacent magnetic sections face each other; and
   the first flexure and the second flexure suspend the movable mass within the ferritic tube and allow movement of the movable mass along the axis.

2. The linear resonant actuator of claim 1, wherein the movable mass is axisymmetric.

3. The linear resonant actuator of claim 1, further comprising:
   a set of one or more spacers; wherein,
   each spacer is disposed between a pair of adjacent magnet sections.

4. The linear resonant actuator of claim 3, wherein:
   the movable mass further includes,
   a first disc; and
   a second disc;
   the set of magnet sections is disposed between the first disc and the second disc; and
   each of the first disc and the second disc has a first diameter, perpendicular to the axis, greater than a second diameter of any magnet section in the set of magnet sections.

5. The linear resonant actuator of claim 1, further comprising:
   a core; wherein,
   each magnet section surrounds the core.

6. The linear resonant actuator of claim 5, wherein the core is non-ferritic or mildly ferritic.

7. The linear resonant actuator of claim 1, further comprising:
   a first endcap attached to the first end of the ferritic tube; and
   a second endcap attached to the second end of the ferritic tube; wherein,
   the first endcap is non-ferritic or mildly ferritic; and
   the second endcap is non-ferritic or mildly ferritic.

8. The linear resonant actuator of claim 7, wherein:
   the first flexure has a portion extending between the first endcap and the ferritic tube.

9. A linear resonant actuator, comprising:
   a frame;
   an axisymmetric movable mass mounted to the frame and movable along an axis, the axisymmetric movable mass including,
   a core; and
   a set of magnet sections, each magnet section disposed at a different position along the axis and encircling the core, and each magnet section having opposite magnetic poles disposed at different positions along the axis, with like magnetic poles of adjacent magnet sections facing each other;
   a set of flexures attaching the axisymmetric movable mass to the frame and constraining movement of the axisymmetric movable mass to movement along the axis, the set of flexures suspending the movable mass within the frame; and
   at least one electric coil encircling the axisymmetric movable mass and fixed to the frame.

10. The linear resonant actuator of claim 9, wherein the set of flexures comprises a flexure having a planar rest state perpendicular to the axis.

11. The linear resonant actuator of claim 9, wherein the set of flexures comprises a flexure having an expanded three-dimensional rest state perpendicular to the axis.

12. The linear resonant actuator of claim 9, wherein the set of flexures comprises a flexure having a set of arms, each arm in the set of arms having a trajectory that spirals around the axis.

13. The linear resonant actuator of claim 12, wherein:
at least one arm in the set of arms has,
- a distal end;
- a proximal end; and
- a middle portion between the distal end and the proximal end; wherein, the middle portion has a smaller width than a width of the distal end or the proximal end.

14. The linear resonant actuator of claim 9, wherein the set of magnet sections is part of a monolithic material.

15. A haptic actuator, comprising:
an enclosure having,
- a cylindrical body portion;
- a first end cap disposed at a first end of the cylindrical body portion; and
- a second end cap disposed at a second end of the cylindrical body portion;

a movable mass housed within the enclosure and movable along an axis extending between the first end cap and the second end cap, the movable mass including a set of magnet sections disposed along the axis;

a first flexure having a first inward portion attached to a first end of the movable mass and a first outward portion attached to the enclosure between the cylindrical body portion and the first end cap;

a second flexure having a second inward portion attached to a second end of the movable mass and a second outward portion attached to the enclosure between the cylindrical body portion and the second end cap, the first and second flexures cooperate to suspend the movable mass with respect to the enclosure; and a set of one or more electric coils wrapped around the axis of the movable mass, between the cylindrical body portion of the enclosure and the movable mass.

16. The haptic actuator of claim 15, wherein:
the movable mass comprises at least one mass-increasing disc disposed along the axis; and
the at least one mass-increasing disc is one of non-ferritic or mildly ferritic.

17. The haptic actuator of claim 15, further comprising:
a dielectric ring around which an electric coil in the set of one or more electric coils is wound; wherein,
the movable mass extends through the dielectric ring.

18. The haptic actuator of claim 17, further comprising:
a ferrofluid disposed between the dielectric ring and the movable mass.

19. The haptic actuator of claim 15, further comprising:
a dielectric cushion attached to the first end cap, between the first end cap and the movable mass.

20. The haptic actuator of claim 15, further comprising:
a flexible circuit, electrically connected to an electric coil in the set of one or more electric coils, and conformed to a portion of an outer surface of the cylindrical body portion of the enclosure.

* * * * *